US005646499A

United States Patent [19]
Doyama et al.

[11] Patent Number: 5,646,499
[45] Date of Patent: Jul. 8, 1997

[54] INVERTER CONTROL APPARATUS

[75] Inventors: Yoshiaki Doyama, Hirakata; Keizo Matsui, Kobe; Yoshiteru Ito, Ibaraki; Kaneharu Yoshioka, Katano; Hideo Ogata, Yao; Izumi Yoshida, Nara-ken; Shusaku Watakabe, Nara, all of Japan

[73] Assignees: Matsushita Electric Industrial Co.,Ltd.; Matsushita Refrigeration Company, both of Osaka-fu, Japan

[21] Appl. No.: 516,659

[22] Filed: Aug. 18, 1995

[30] Foreign Application Priority Data

Aug. 25, 1994 [JP] Japan .................................. 6-200659
Nov. 28, 1994 [JP] Japan .................................. 6-293324

[51] Int. Cl.$^6$ ........................................................ H02P 5/408
[52] U.S. Cl. ............................ 318/801; 318/807; 318/808
[58] Field of Search ........................... 318/729, 800–802, 318/807–811

[56] References Cited

U.S. PATENT DOCUMENTS

| | | | |
|---|---|---|---|
| 4,477,761 | 10/1984 | Wolf. | |
| 4,680,526 | 7/1987 | Okuyama et al. | 318/802 |
| 4,689,543 | 8/1987 | Hucker. | |
| 4,780,658 | 10/1988 | Koyama | 318/808 |
| 5,241,256 | 8/1993 | Hatanaka et al. | 318/801 |
| 5,548,199 | 8/1996 | Bidaud et al. | 318/802 |

FOREIGN PATENT DOCUMENTS

| | | |
|---|---|---|
| 584 748 | 3/1994 | European Pat. Off.. |
| 605 328 | 7/1994 | European Pat. Off.. |
| 93/07496 | 4/1993 | WIPO. |

OTHER PUBLICATIONS

Green, T.C. et al., "Non-Invasive Speed Measurement of Inverter Driven Induction Motors", Oct. 7, 1990, Conference Record of the Industry Applications Society Annual Meeting, vol. 1, No. Meeting 25, pp. 395–398, Institute of Electrical and Electronics Engineers.

Azzeddine Ferrah, et al., "An FFT–Based Novel Approach to Noninvasive Speed Measurement in Induction Motor Drives", Dec. 1, 1992, IEEE Transactions on Instrumentation and Measurement, vol. 41, No. 6, pp. 797–802.

Muneaki Ishida, "Steady–State Characteristics of a Torque and Speed Control System of an Induction Motor Utilizing Rotor Slot Harmonics for Slip Frequency Sensing", IEEE Transactions on Power Electronics, No. 33, Jul. 1987, pp. 257–263.

Manfred Beck et al., "A New Method for the Calculation of the Slip Frequency for a Sensorless Speed Control of a Squirrel–Cage Induction Motor", PESC '85 Record, 24–28 Jun. 1985, pp. 678–683.

"Low Pressure Type Scroll Compressor for Air Conditioners", Sawai et al., National Technical Report, vol. 35, No. 6, Dec. 1989, Japan.

(List continued on next page.)

*Primary Examiner*—Bentsu Ro
*Attorney, Agent, or Firm*—Wenderoth, Lind & Ponack

[57] ABSTRACT

An inverter control apparatus for controlling a command frequency and a command voltage which are supplied to an inverter which then supplies AC power of a desired frequency, accordingly, to an induction motor. The inverter control apparatus receives a requested rotational speed of the motor and an actual rotational speed of the motor is obtained by detecting a frequency of a fluctuation component of a drive current supplied from the inverter to the induction motor. The difference between the requested rotational speed and the actual rotational speed represents a slip amount, which is added to the requested rotational speed to produce a command frequency. The command voltage is set to a voltage acquired when the monitored drive current is at a minimum value. Thus, the inverter control apparatus is able to maintain power consumption at the lowest possible level in response to changes in the operating environment without requiring a motor constant input or a motor speed detector, while compensating the slip ratio of the induction motor to maintain the motor speed at a target level.

17 Claims, 23 Drawing Sheets

OTHER PUBLICATIONS

"Quieting Technique for Inverter Scroll Package Air Conditioners (Low Noise Technologies for Packaged Type Air Conditioners)" described in Reitoshi (a Japanese Journal of refrigeration), Jun. 1992.

"Third Generation Intelligent Power Modules", Mitsubishi Electric Technical Review, vol. 67, No. 9, 1993, Japan.

"A New Generation High Speed Low Loss IGBT Module", G. Majumdar et al., Proceedings of 1992 International Symposium on Power Semiconductor Devices & ICs, Tokyo, Japan.

"Micro Invertor FVR–C9S", Imamura, et al., Fuji Jiho (Japanese Magazine), vol. 67, No. 11, 1994.

"Power Electronics Nyumon (basics)", of Sakae Murayama et al. published Mar. 25, 1994 by OHM Sha Ltd, Japan.

Fig.19B

MODIFIED F/V TABLE

| FREQ | VOLTAGE |
|---|---|
| f30 | $V_{31}$ |
| f40 | $0.5(V_{31}+V_{51})$ |
| f50 | $V_{51}$ |
| f60 | $V_{61}$ |
| f70 | $V_{71}$ |

Fig.19A

MODIFIED F/V TABLE

| FREQ | VOLTAGE |
|---|---|
| f30 | $V_{31}$ |
| f40 | — |
| f50 | $V_{51}$ |
| f60 | $V_{61}$ |
| f70 | $V_{71}$ |

$f_{ref}$ →

INVERTER CONTROL APPARATUS

BACKGROUND OF THE INVENTION

1. Field of the Invention

The present invention relates to the control of an inverter for driving an induction motor at variable speeds by varying the drive frequency of the motor, and relates particularly to an inverter control apparatus for air conditioning systems using a heat pump cycle to provide heating and cooling.

2. Description of the Prior Art

In general, compressors used in air conditioning systems for the home, small office, or small retail establishment are driven by induction motors. The slip frequency, i.e., the difference between the drive frequency and rotational frequency, of an induction motor tends to fluctuate under load, and thus the efficiency of the motor will vary.

To compensate for this variation while maintaining high motor efficiency, vector control methods, whereby the load is calculated from the motor current, have been proposed as a replacement for the conventional voltage-frequency (V/F) control methods for obtaining an operating voltage proportional to the operating command frequency.

An example of a high efficiency control method incorporating vector control technologies is shown in FIG. 1. This method is based on the "quieting technique for inverter scroll package air conditioners" described in "Reitoshi" (a Japanese journal on refrigeration), June 1992, pp. 50–55. The AC power supply 6 for the induction motor 1 which drives the compressor is first converted to a DC power voltage by the diode bridge 5 and a smoothing capacitor 4. The DC power voltage and frequency are then adjusted by the three-phase PWM inverter 2 to control and vary the speed of the induction motor 1.

It is often found difficult to install rotation detectors on air conditioning compressors. Therefore, in order to detect the motor speed, by calculation using an induction motor constant, and drive the motor with high efficiency, at least two current levels must be detected for the induction motor 1.

The excitation current and torque current calculator 101 detects motor currents Iu and Iv using current sensors 3u and 3v to obtain the excitation current Iid and torque current Iiq, respectively. The detected torque current Iiq is roughly proportional to the slip frequency fs, which can therefore be calculated using the torque current Iiq and the motor constant. The command frequency can be adjusted to compensate for the slip frequency fs, and thereby maintain the motor speed at a controlled constant level.

Thus, the slip frequency is calculated by the slip frequency control means 7, and the motor speed is corrected so that the induction motor 1 rotates at a level equal to the rotational command frequency fref output by the heat pump cycle control means. Referring to FIG. 1, the adder 8 adds the rotational command frequency fref from the heat pump cycle control means and the value of a correction frequency to obtain the actual command frequency f1 for the three-phase PWM inverter 2.

Identifying the primary resistance, that is one motor constant, is accomplished by the primary resistance identifier 102 to obtain a more precise primary resistance value based on the difference between the excitation current command I1*d, obtained by the current minimizing control means 103, and the detected excitation current Iid. The actual primary voltage is then determined by the primary voltage compensator 104 based on the primary resistance obtained, the excitation current command I1*d, the torque current I1q, and the actual command frequency. The actual primary voltage is then supplied to the three-phase PWM inverter 2. The current supply is thus controlled, based on the rotational command frequency fref from the heat pump cycle control means, to provide the minimum current level required to keep the induction motor 1 operating at the command speed. Thus, by minimizing the current supply, efficiency of the motor improves approximately 10% at a 1.1 kgm motor torque. Furthermore, improvement has also been confirmed at other torque levels.

The method of the prior art described controls motor efficiency by obtaining the slip frequency from the torque current, an operation which requires a motor constant. Possible motor constants include the primary resistance, secondary resistance, and various inductances. These constants are known, however, to significantly fluctuate according to the temperature and other factors. This fluctuation results in a degradation of control performance such as an undesirable change in the rotational speed.

Furthermore, minimization of the motor current does not always yield a maximized motor efficiency. As shown in FIG. 24, when the voltage V1 applied to a motor increases, power consumption drops to the lowest level V1(Pmin) before the motor current drops to the lowest level V1(Imin).

SUMMARY OF THE INVENTION

An object of the present invention is to provide an inverter control apparatus for constantly maintaining power consumption at the lowest possible level in response to changes in the operating environment without requiring a motor constant input or a motor speed detector, while compensating the slip ratio of the induction motor to maintain the motor speed at a target level.

Scroll compressors recently developed for air conditioning systems are characterized by extremely low fluctuation in the gas compression torque per revolution, thereby enabling a smooth and quiet operation. As a result, current fluctuation is minimal in the induction motors used to drive these scroll compressors. Accordingly, a further object of the present invention is to provide an inverter control apparatus comprising various types of rotational period detectors as a means of maintaining compatibility with induction motors used with such scroll compressors.

A further object of the present invention is to provide an inverter control apparatus for protecting semiconductor elements of an induction motor without reducing the required output even under relatively exceptional operating conditions. These exceptional conditions include, with respect to air conditioning applications, heating even when the environmental temperature is relatively high since as the environmental temperature rises, the refrigerant pressure rises, and the torque load of the compressor motor rises.

For reference, the gas compression torque characteristics of a scroll compressor and rolling piston compressor to which the present invention is applicable as shown in FIG. 2, and the current wave forms of an induction motor driving these compressors are shown in FIGS. 3A and 3B.

The graph in FIG. 2 is taken from FIG. 2 of "Low pressure type scroll compressors for air conditioners," Sawai et al., National Technical Report, Vol. 35, No. 6, Dec. 1989, pp. 80–81. Virtually no gas compression torque is required at a crank angle from 0° to 90° with a rolling piston compressor, but an extremely high torque is required at a crank angle from 180° to 270°. When an induction motor is driven under such load conditions, the current consumed at crank angles requiring virtually no torque is low, but increases as the crank angle requires increasing torque. As a result, the current flowing through the motor fluctuates according to the rotational angle as shown in FIG. 3A, and the period of this fluctuation matches the rotational frequency.

With a scroll compressor, however, the fluctuation in the gas compression torque is slight at approximately 10% of the mean, and the current fluctuation is therefore also small.

To achieve the aforementioned objects, an inverter control apparatus according to one preferred embodiment of the present invention comprises a means for receiving a requested rotational speed of the motor, a current detection means for detecting a drive current supplied to the motor, a discrimination means for discriminating a frequency of a fluctuation component of the drive current detected by the current detection means, the fluctuation component frequency representing an actual rotational speed of the motor, a slip detection means for detecting a slip amount of the induction motor by taking a difference between the actual rotational speed and the requested rotational speed, a command frequency producing means for producing data commensurate with the command frequency by adding the slip amount to the requested rotational speed, and a command voltage generating means for generating the command voltage by monitoring the drive current and for setting the command voltage to a voltage acquired when the monitored drive current is at a minimum value.

An inverter control apparatus according to another preferred embodiment of the present invention comprises a current detection means for detecting a drive current supplied to the motor, a power calculation means for calculating a power consumption of the motor based on the sum of products of an integer at multiple periods of the cycle of the inverter output voltage and the detected drive current at a period greater than one cycle of the inverter output, and a command voltage generating means for generating the command voltage by monitoring the power and for setting the command voltage to a voltage acquired when the monitored power is at a minimum value.

The apparatus of this embodiment further comprises a means for receiving a requested rotational speed of the motor, a current conversion means for calculating an excitation current and a torque current of the induction motor based on a phase difference between the inverter output voltage and the detected drive current, a slip amount calculation means for calculating a slip amount based on the excitation current, the torque current, and a time constant of the motor, and a command frequency producing means for producing data commensurate with the command frequency by adding the slip amount to the requested rotational speed.

An inverter control apparatus according to yet another preferred embodiment of the present invention comprises a current detection means for detecting a drive current supplied to the motor, a power calculation means for calculating a power consumption of the motor based on the sum of products of the inverter output voltage and the detected drive current, a selecting means for selecting either one of the detected drive current and the power, the detected drive current being selected when the detected drive current is greater than a predefined current level, and the power being selected when the detected drive current is less than the predefined current level, and a command voltage generating means for generating the command voltage by monitoring selected data provided by the selecting means and for setting the command voltage to a voltage acquired when the monitored data is at a minimum value.

According to the inventer control apparatus of the present invention, a current fluctuation, corresponding to the actual motor speed occurs as a result of the pulsating load variation during the driving of the compressor. The slip frequency can be measured by discriminating the frequency of this current fluctuation. Therefore, the current can be minimized while controlling the slip frequency by adjusting the output voltage of the inverter.

With an inverter control apparatus according to the present invention, the frequency component corresponding to the actual motor speed is lower than the drive frequency. Therefore, by attenuating the high frequency information, the drive frequency and actual motor speed component can be distinguished even when the pulsating load variation is small, and thus, it is possible to minimize the current while controlling the slip frequency as described in the first embodiment.

By digitizing the detected current according to the present invention, the information pertaining to the actual motor speed contained in the detected current data becomes the variation in the period of the digitization information. By discriminating the frequencies of the fluctuation in this cycle, the drive frequency information and the actual motor speed component can be discriminated even when the pulsating load fluctuation is small. Therefore, it is possible, as with the first invention described above, to control the slip frequency, and to minimize the current.

The effects of a pulsating load change on the motor also appear in the same frequency component in the DC component of the inverter. Thus, by detecting the current of the DC component of the inverter, to accomplish current minimization control by the present invention, minimizing the current during current load conditions also effectively minimizes power consumption.

Furthermore, it is also possible to interpolate and correct the overall characteristics from the minimization control result based on the partial actual command frequency. This is possible by pre-storing the frequency-voltage characteristics under known standard conditions even when the operation command from the heat pump cycle control means is only a partial frequency. Therefore, the present invention described above makes it possible to roughly predict the conditions necessary for achieving high efficiency across the entire operating range of a motor based on partial operating conditions.

Power consumption by the motor can also be minimized in the present invention described above by calculating the actual motor power consumption and adjusting the applied voltage by obtaining the sum of products of the motor current and applied voltage for a period greater than one cycle of the drive signal.

Unless the operational command of a motor changes suddenly, the current characteristic of each wire to a three-phase motor is a sine wave with the phase difference of each wire current being offset from the others by $\frac{2}{3}\pi$, and the applied voltage is also essentially a sine wave. Thus, it is possible to separate the excitation current component and the torque current component by detecting the phase differences of the voltage and the current. Because the slip frequency is proportional to the torque current component and the excitation current component, compensation control of the slip frequency can be achieved by calculating the slip frequency, and thus the motor power consumption can be minimized while maintaining the same motor speed by the present invention described above.

By the present invention, high efficiency operational control can be achieved for a motor by means of a power consumption minimization control when the motor current is above or below a predetermined level. The current minimization control operates to achieve priority current reduction control, thus avoiding the overloading of a power consumption control element.

By the present invention, the voltage drop in the power consumption control element can be calculated even when the motor current increases and the voltage drop component of the power consumption control element increases. Thus, a more accurate power consumption minimization control is obtainable by using a more accurate voltage wave form.

BRIEF DESCRIPTION OF THE DRAWINGS

FIGS. 19A and 19B are diagrams used to describe the operation of the fifth embodiment of the present invention, particularly showing the modified frequency-voltage conversion look-up table;

DESCRIPTION OF THE PREFERRED EMBODIMENTS

Embodiment 1

Figure 4:
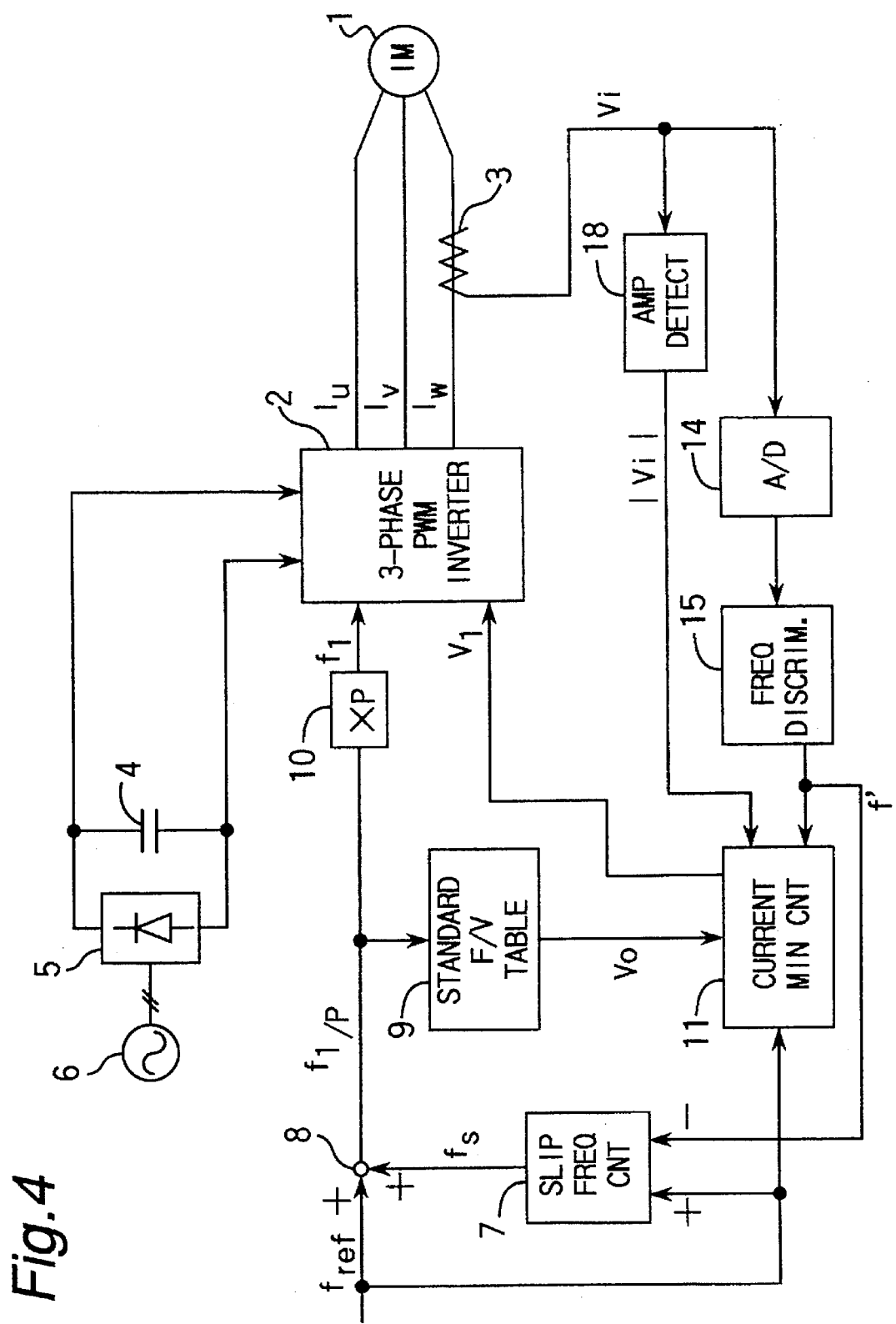
FIG. 4 is a block diagram showing an inverter control apparatus according to a first embodiment of the present invention.

The first embodiment of an inverter control apparatus according to the present invention is described below with reference to FIG. 4.

The inverter control apparatus of the present invention is used, for example, in an air conditioning system for heating and cooling. The inverter control apparatus comprises an induction motor 1 which drives the compressor used to compress and liquefy the coolant, an AC power supply 6, and a rectification circuit comprising a diode bridge 5 and smoothing capacitor 4 for converting the AC power to a DC supply. The DC supply is then converted to a three-phase AC supply by a three-phase PWM inverter 2 to drive the induction motor 1 at a desired speed. The three-phase PWM inverter 2 is a transistor-type inverter comprising an insulated gate bipolar transistor (IGBT) for controlling the drive voltage and drive frequency supplied to the induction motor 1 by varying the command voltage V1 and command frequency f1. A detail of the three-phase PWM inverter 2 is disclosed, for example, in a Japanese book "POWER ELECTRONICS NYOMON (basics)" of Sakae MURAYAMA et al. published on Mar. 25, 1994 by OHM Sha Ltd.

The inverter control apparatus further comprises a current sensor 3 for producing a voltage signal Vi indicative of the current fed through one of the drive wires $1_w$, an analog-to-digital converter (A/D) 14, a frequency discriminator 15, a slip frequency controller 7, an amplitude detector 18, a current minimization controller 11, an adder 8, a standard frequency-voltage conversion look-up table 9, and a multiplier 10.

The rotational command frequency fref, which is a target rotational speed (rps), and the output Vi of the current sensor 3, are input to the inverter control system, which outputs the command voltage V1 and command frequency f1.

The current sensor 3 produces a voltage signal Vi representing the current flowing through one of the drive wires $1_u$, $1_v$ and $1_w$, such as $1_w$, of the induction motor 1. The signal Vi is applied through the amplitude detector 18 to the current minimization controller 11, and also through the A/D converter 14 to the frequency discriminator 15. The frequency discriminator 15 extracts the frequency component corresponding to the motor speed (rps), and products a signal f' (FIG. 20A) representing the actual rotational speed (rps) of the induction motor 1. The signal f' is applied to the slip frequency controller 7 and the current minimization controller 11.

The slip frequency controller 7 is formed by a subtractor for subtracting the actual motor speed f' from the target rotational speed fref to produce a slippage fs. The adder 8 adds the target rotational speed fref and the slippage fs to produce a modified target rotational speed f1/P which can be given by the following equation (1):

$$f1/P = fref + fs \qquad (1)$$

in which P represents the number of poles in the induction motor, and f1 is the command frequency of the three-phase AC voltage to be supplied to the induction motor 1. The multiplier 10 multiplies the modified target rotational speed f1/P by the number P of poles to produce the command frequency f1.

Figure 17:
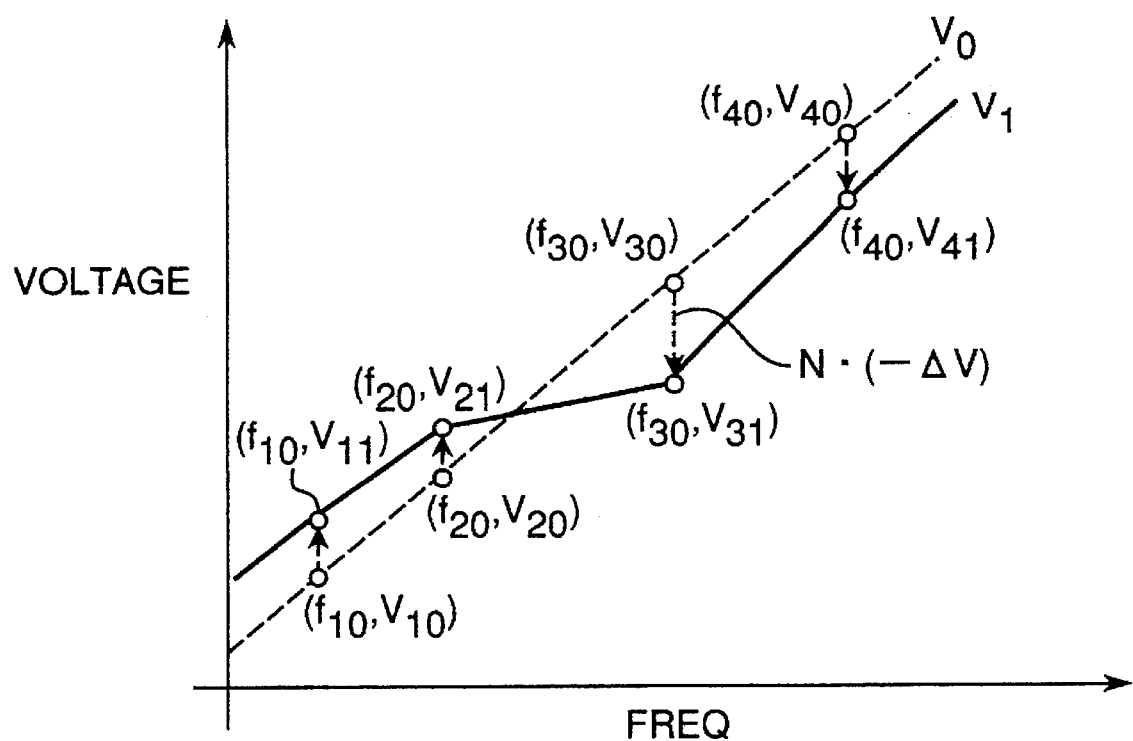
FIG. 17 is a graph showing data V0 carried in a standard frequency-voltage conversion look-up table, and a modified frequency-voltage conversion look-up table.

The standard frequency-voltage conversion look-up table 9 is a memory used for storing standard data such as shown by the dotted line in FIG. 17, so that when the modified target rotational speed f1/P (f30 in FIG. 17) is input a corresponding voltage V0 (V30 in FIG. 17) is produced. Instead of receiving the modified target rotational speed f1/P, the standard frequency-voltage conversion look-up table 9 can receive the command frequency f1. This results in a change of the values in the table.

The current minimization controller 11 receives an absolute value of the amplitude of the signal Vi from the amplitude detector 18, and monitors the signal Vi and adjusts the voltage V0 to a command voltage V1 so as to maintain a constant actual frequency. This is accomplished by maintaining the signal Vi at the minimum value so as to maintain the current flowing through the wires $1_u$, $1_v$, and $1_w$ at the minimum value. As a result, it is possible to maintain the current of the induction motor at the smallest required level while holding the speed of the induction motor at the target frequency fref. The details of the current minimization controller 11 will be described below in connection with FIGS. 16 and 17.

Figure 16:
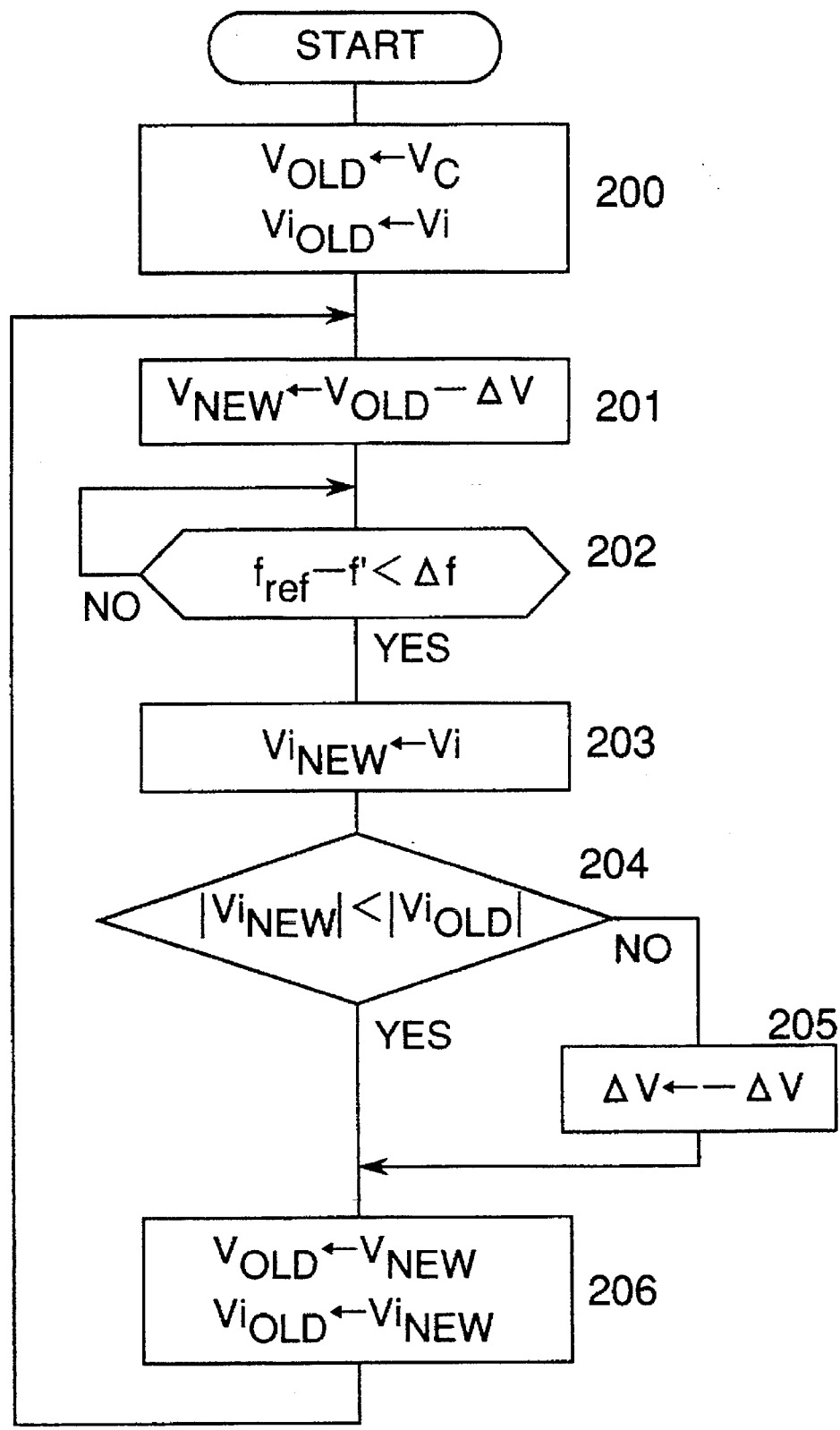
FIG. 16 is a flow chart used to describe the operation of the computer shown in FIG. 15, particularly of the current minimization controller.

FIG. 16 is a flow chart showing the operation of the current minimization controller 11. The flow chart of FIG. 16 is carried out after selecting the command frequency (f1) or the rotational frequency (f1/P). It is assumed that the rotational frequency (f1/P) is now selected as f30 so that the standard frequency-voltage conversion look-up table 9 produces voltage V30, as represented by the dotted line in FIG. 17.

At step 200, current minimization controller 11 receives the voltage V0 (in this case V30) from the standard frequency-voltage conversion look-up table 9 and also receives the absolute value of current signal Vi from the amplitude detector 18. Furthermore, the voltage V30 is stored as $V_{OLD}$ and the voltage Vi is stored as $Vi_{OLD}$.

At step 201, the voltage V30 as stored in $V_{OLD}$ is subtracted by a small predetermined amount ΔV, and the difference $V_{OLD}$-ΔV is stored as $V_{New}$.

At step 202, a detection is made as to whether the difference between the target frequency fref and the rotational frequency f' is less than a small predetermined amount Δf, i.e., fref-f'<Δf. If the difference is not less than Δf, indicating that the induction motor 1 is still accelerating and is not stabilized, step 202 is repeated. If the difference is less than Δf, indicating that the induction motor 1 is stabilized, then the operation goes to step 203. Furthermore, it is also possible to experimentally determine the time required for the slip frequency compensation control to stabilize and use a constant wait time slightly longer than this experimentally determined time.

At step 203, signal Vi, representing the current flowing through wire $1_w$ after stabilizing the induction motor 1, is received and stored as $Vi_{New}$.

At step 204, a detection is made as to whether the absolute value of the $Vi_{NEW}$ is smaller than the absolute value of $Vi_{OLD}$. When $|Vi_{New}|<|Vi_{OLD}|$, it is realized that Vi representing the current flowing through wire $I_w$ is decreasing. In this case, the operation goes to step 206.

At step 206, $V_{New}$ is stored as $V_{OLD}$, and $Vi_{New}$ is stored as $Vi_{OLD}$. The operation then returns to step 201.

On the other hand, when $|Vi_{New}|>|Vi_{OLD}|$, it is realized that the Vi is increasing. In this case, the operation goes to step 205.

At step 205, the sign of ΔV is changed from (+) to (−) or vice versa.

Therefore, when the operation cycle of steps 201–206 repeats a number of times with the result of step 204 being always "YES", it is realized that Vi is gradually decreasing. Thereafter, if the next operation cycle results in producing "NO" at step 204, it is realized that Vi has hit the minimum value and will start to increase. After obtaining the minimum value of Vi in the above described manner, the operation cycles will alternately toggle between "YES" and "NO" at step 204 to keep the signal Vi at the minimum value. The date $V_{OLD}$ obtained at step 206 is taken and is used as the command voltage V1 which is applied to the 3-phase PWM inverter 2. As a result, it is possible to drive the induction motor 1 at the lowest possible current while keeping the current fluctuation as being equivalent to the small voltage ΔV.

In the above example, since the rotational frequency (f1/P) is selected as f30, the voltage V30 (generally voltage V0), as obtained from standard frequency-voltage conversion look-up table 9, is changed to V31 (command voltage V1).

In this manner, command voltages for various sampling frequencies can be obtained by storing the voltage corresponding to the minimum current obtained at the selected sampling frequencies. These results can be stored in a memory as a modified frequency-voltage conversion look-up table. With the use of the modified frequency-voltage conversion look-up table, it is possible to quickly restore the optimum voltage at a particular frequency even after the command frequency fref varies temporarily to a different frequency.

Figure 5:
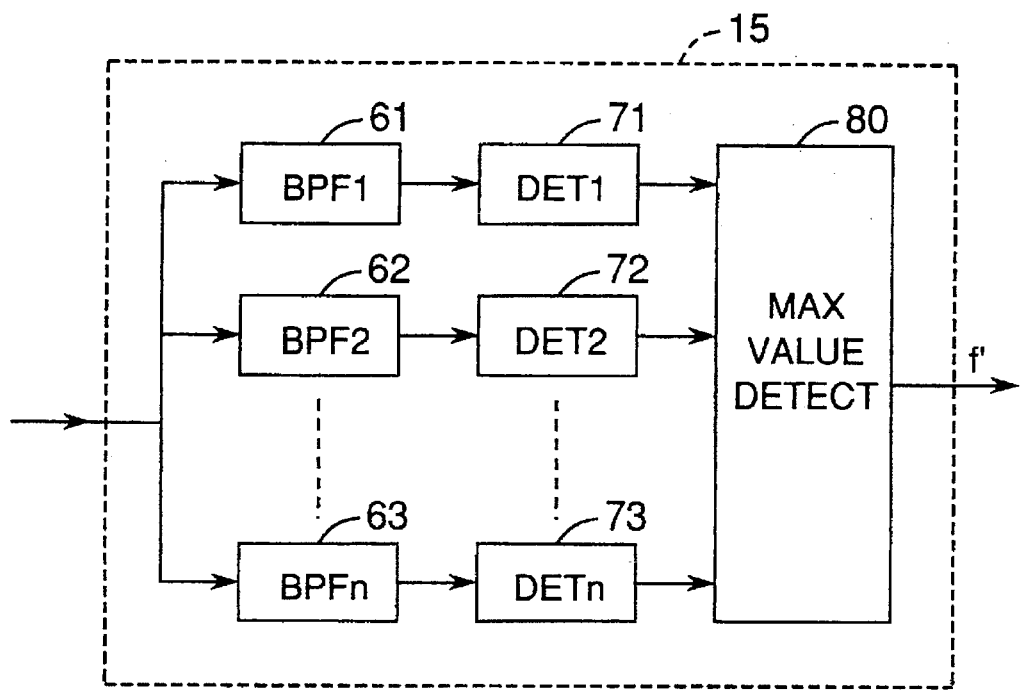
FIG. 5 is a block diagram showing a detail of a frequency discriminator shown in FIG. 4.

Referring next to FIG. 5, a block diagram of one example of the frequency discriminator 15 is shown. The input information to the frequency discriminator 15 is inputted to the plural bandpass filters 61, 62, . . . 63. The center frequency of each of these bandpass filters 61, 62, . . . 63 is different. The output from each bandpass filter is inputted to a corresponding amplitude detector 71, 72, . . . 73 for amplitude detection. Each of the amplitude detectors 71, 72 . . . 73 outputs respective information to the maximum value detector 80, which determines which of the bandpass filter outputs is greatest. The result is then transmitted from the maximum value detector 80 as the actual motor speed f'.

Figure 1:
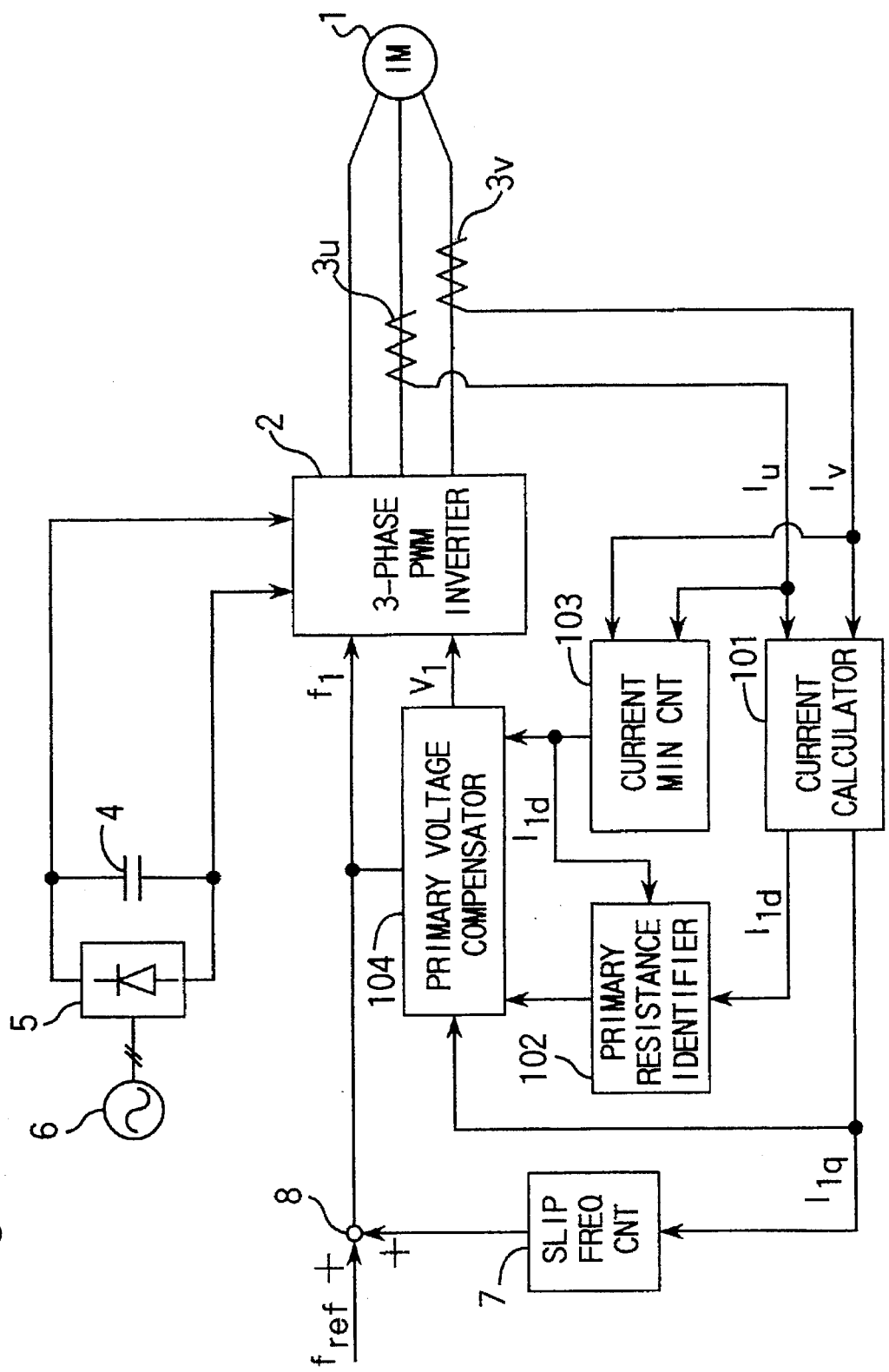
FIG. 1 is a block diagram of an inverter control apparatus according to the prior art.
Figure 2:
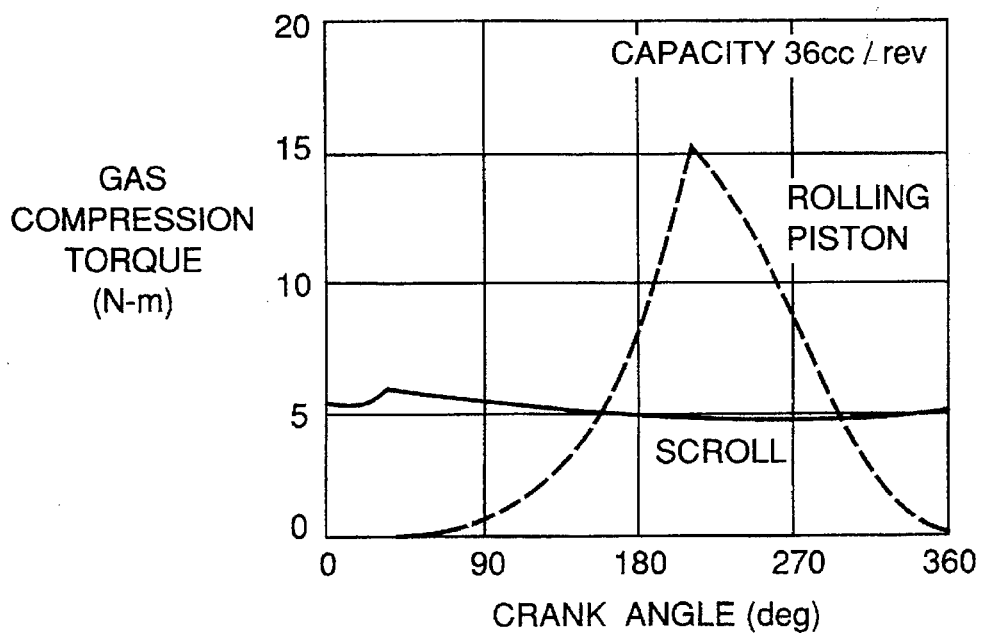
FIG. 2 is a gas compression torque characteristic diagram of a scroll compressor and rolling piston compressor to which the present invention is applicable.
Figure 3A:
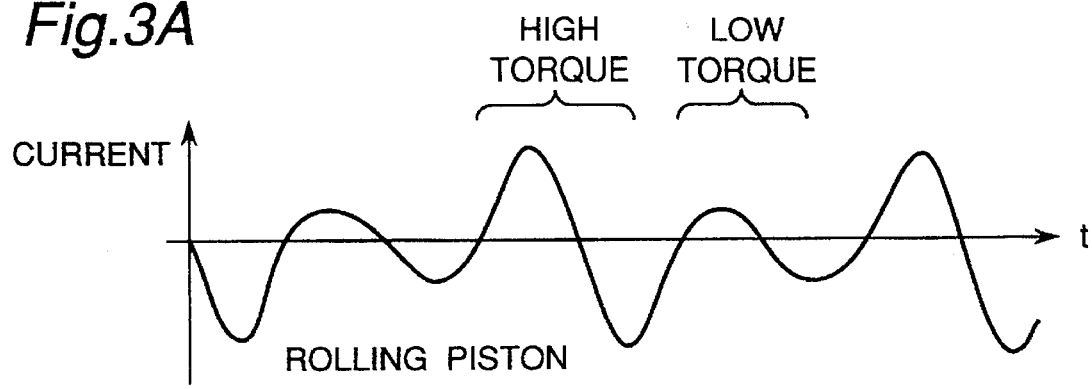
FIGS. 3A and 3B are current wave diagrams of a scroll compressor and rolling piston compressor, respectively, to which the present invention is applicable.
Figure 3B:
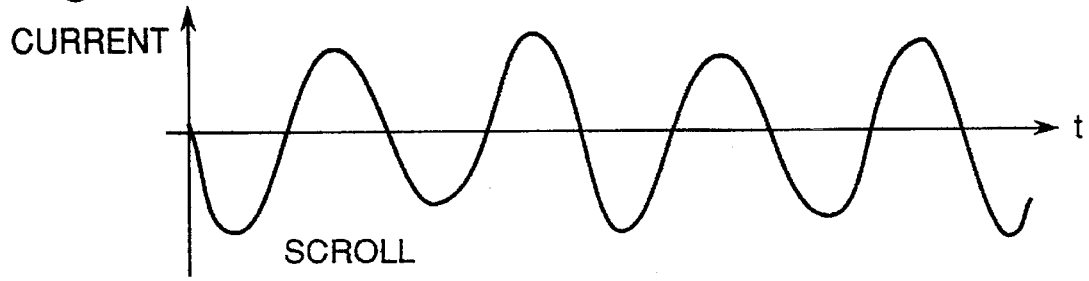

It is to be noted that while a configuration comprising plural bandpass filters is shown in FIG. 5, these bandpass filters can also be achieved with digital signal processing technologies by means of time sharing. Furthermore, the maximum value detector 80 can be easily achieved through software technology. Therefore, using the apparatus described, the current flowing through the induction motor 1, while driving a rolling piston type compressor, varies significantly according to the rotational angle as shown in FIG. 3. Furthermore, the cycle of the fundamental wave matches the rotational cycle.

Figure 6:
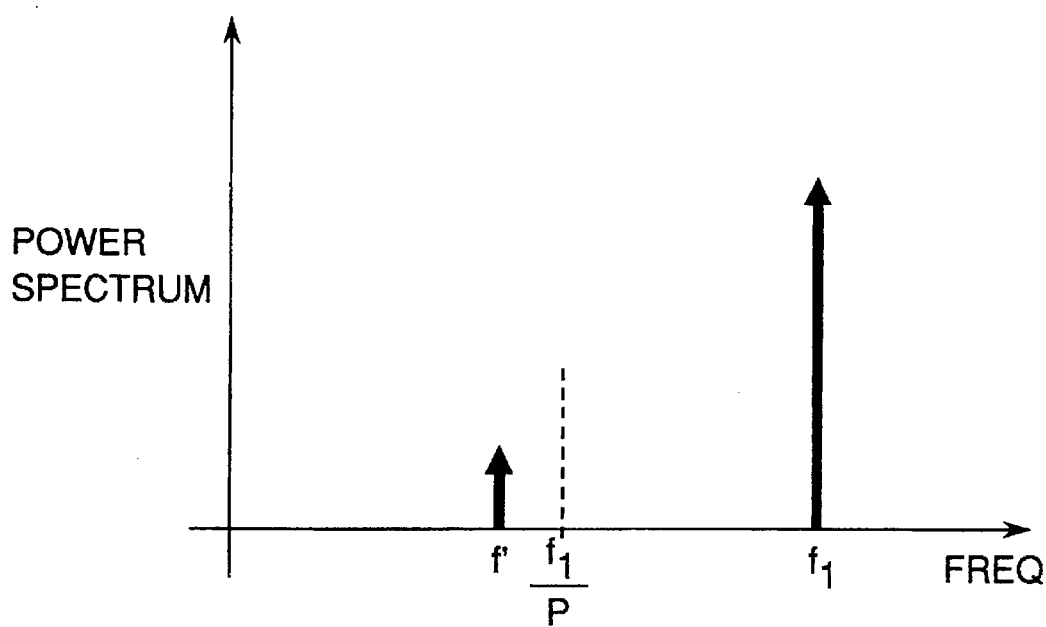
FIG. 6 is a graph showing operation characteristics of the apparatus shown in FIG. 4.
Figure 20A:
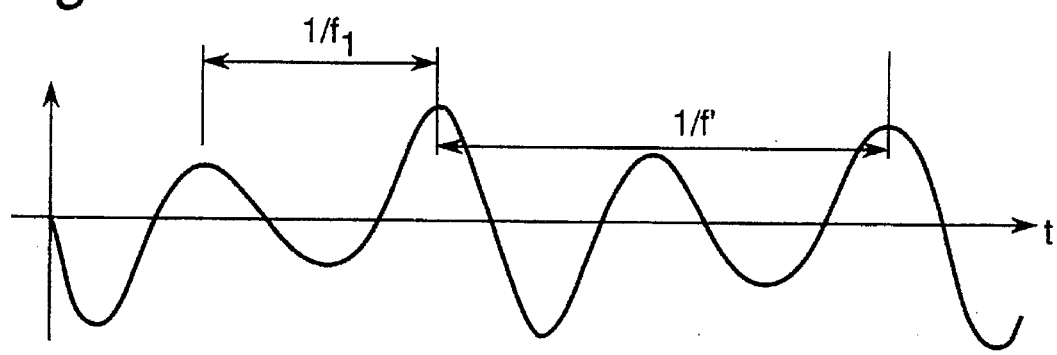
FIGS. 20A and 20B are wave forms used to describe the operation of the first or second embodiment of the present invention.

FIG. 6 is a graph showing the relationship between the command frequency f1 and the actual motor speed f'. As described above, P is the number of poles the motor has, and f1/P is the rotational speed or frequency (rps) when the motor is under a perfect or no-load state. An actual motor, however, has a certain inherent load, and drives at a slightly lower actual rotational frequency f'. The current flowing through the motor is a signal comprising the frequency component of the command frequency f1, and the frequency component of the actual rotational frequency f'. These two frequencies will always differ insofar as P>1, and thus they can be easily separated. Most motors have 2 or 4 poles (P=2 or P=4). An example of a current wave form of a motor is shown in FIG. 20A in which there are two poles (P=2) and the motor is driven by drive frequency f1. As will be realized from this wave form, the actual rotational frequency f' component is added to the fundamental period of the control frequency f1.

The slip frequency controller 7 and adder 8 described above constitute the command frequency control means. The standard frequency-voltage conversion look-up table 9 and current minimization controller 11 constitute the command voltage control means. The command frequency control means, the command voltage control means, the frequency discriminator 15, and the transistor control circuit components of the three-phase PWM inverter 2 can be achieved by means of a single microprocessor.

Figure 15:
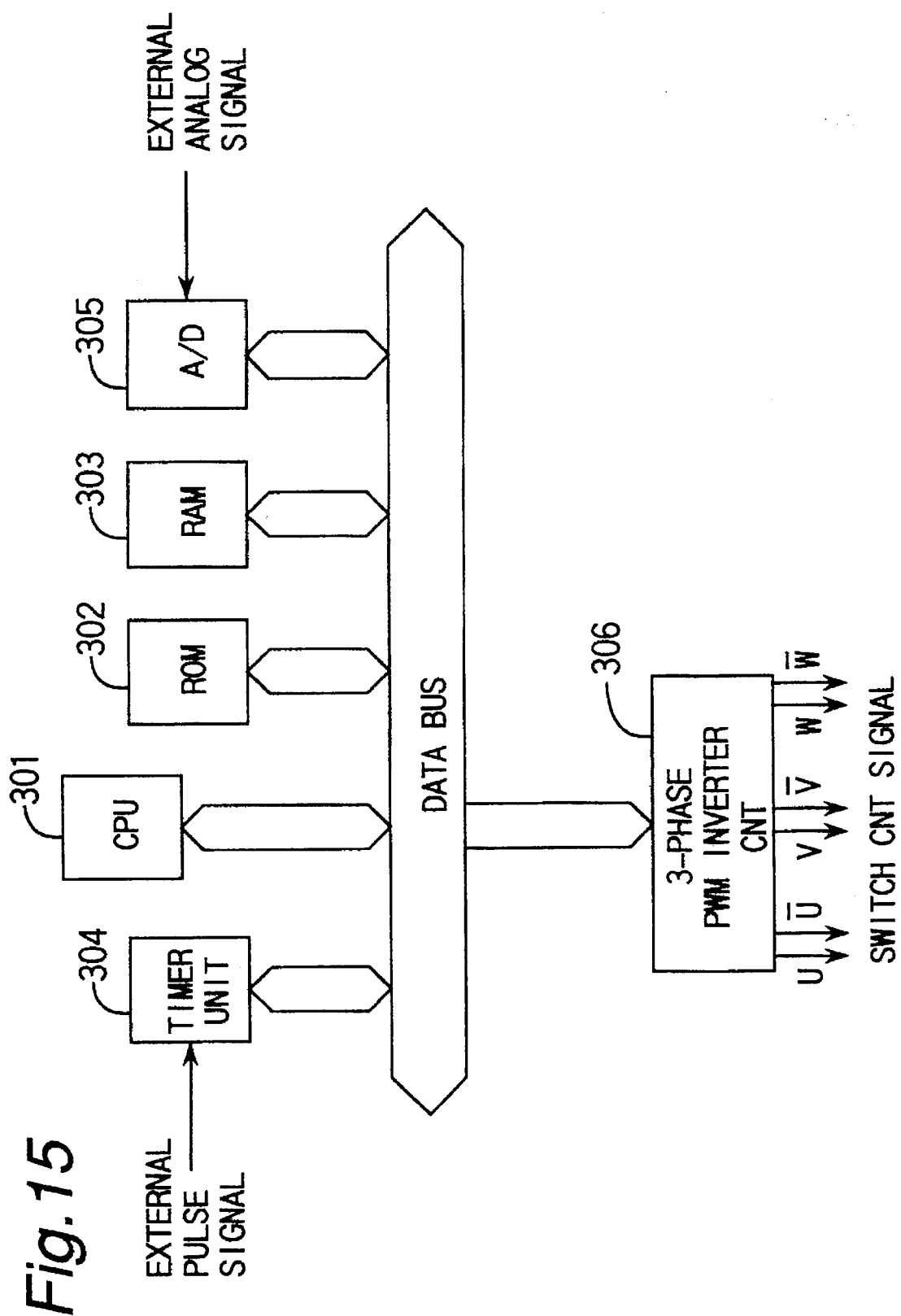
FIG. 15 is a block diagram of a control system of the present invention achieved by a computer.

As shown in FIG. 15, such a microcompressor comprises a central processing unit (CPU) 301 for executing logical and mathematical operations; a read-only memory (ROM) 302 for storing data and commands which control the CPU 301; a random access memory (RAM) 303 for storing the results of operations; a timer 304 for requesting external pulse frequency measurements, or CPU interrupt processing; an A/D converter 305 for inputting external analog signals; a three-phase PWM inverter control unit 306; and a data bus 307 for connecting these components on a time-share basis.

The inverter control unit 306 is a power transistor functioning as the power switching control element of the inverter, or generating a timing pulse (U, V, W and the inverted outputs U, V, W in FIG. 15) to control switching of the IGBT or other devices.

Through normal operation of the CPU 301, ROM 302, and RAM 303 of the above-described microprocessor, it is possible to achieve the A/D converter 14 (FIG. 4) corresponding to the A/D converter 305 in FIG. 15. Furthermore, with the timer 304 enabling interrupt processing at a regular period, the bandpass filters of the frequency discriminator 15 (FIG. 4) can be achieved by means of digital signal processing technologies.

Embodiment 2

Figure 7:
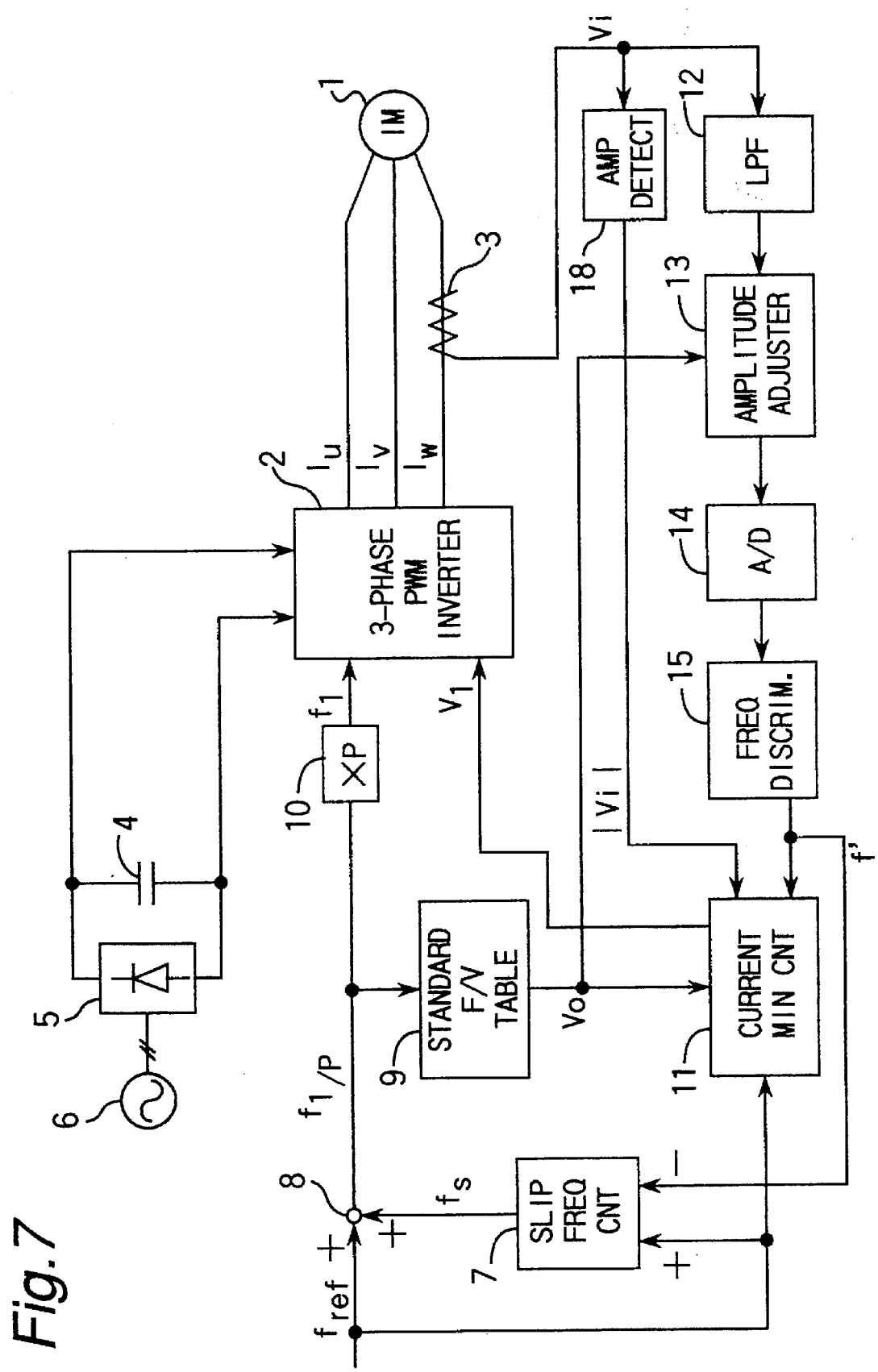
FIG. 7 is a block diagram showing an inverter control apparatus according to a second embodiment of the present invention.

FIG. 7 is a block diagram showing an inverter control apparatus according to the second embodiment of the present invention. This embodiment differs from the first embodiment of FIG. 4 in that a low pass filter 12 and amplitude adjuster 13 are placed between the current sensor 3 and frequency discriminator 15. The inverter control apparatus according to this embodiment can be applied to air conditioning systems using scroll compressors subject to minor current fluctuations.

Figure 20B:
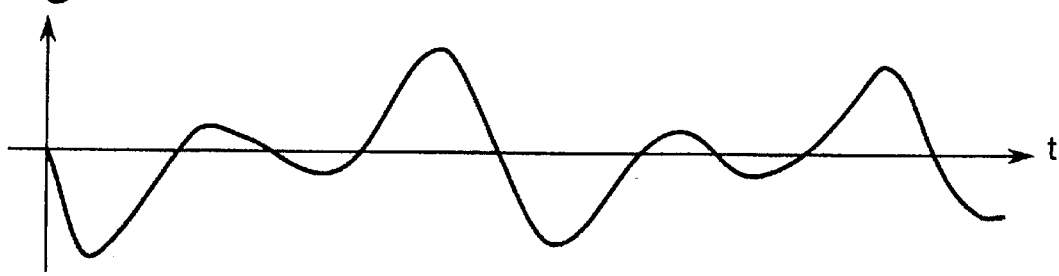

As shown in FIG. 20A, the wave form characteristics detected by the current sensor 3 comprises both the drive command frequency component f1 and the actual rotational frequency component f'. Compared with that of a rolling piston type compressor, the scroll type compressor has a relatively weak rotational frequency component. The detected current is inputted to the low pass filter 12. The low pass filter 12 attenuates both the carrier signal component from the three-phase PWM inverter 2, and the motor drive frequency component f1. FIG. 20B is a graph of the signal wave form after passing through the low pass filter 12, which results in a reduction of the relatively high drive frequency f1 component.

The output from the low pass filter 12 is inputted to the amplitude adjuster 13 for amplitude adjustment based on the output V0 from the standard frequency-voltage conversion look-up table 9. The output of the amplitude adjuster 13 assures a particular signal amplitude, and is transmitted through the A/D converter 14 to the frequency discriminator 15 for detection of the actual rotational frequency. Furthermore, the operating principles of the embodiment shown in FIG. 7 are identical to those as shown in FIG. 4, and further description is therefore omitted below.

Figure 8:
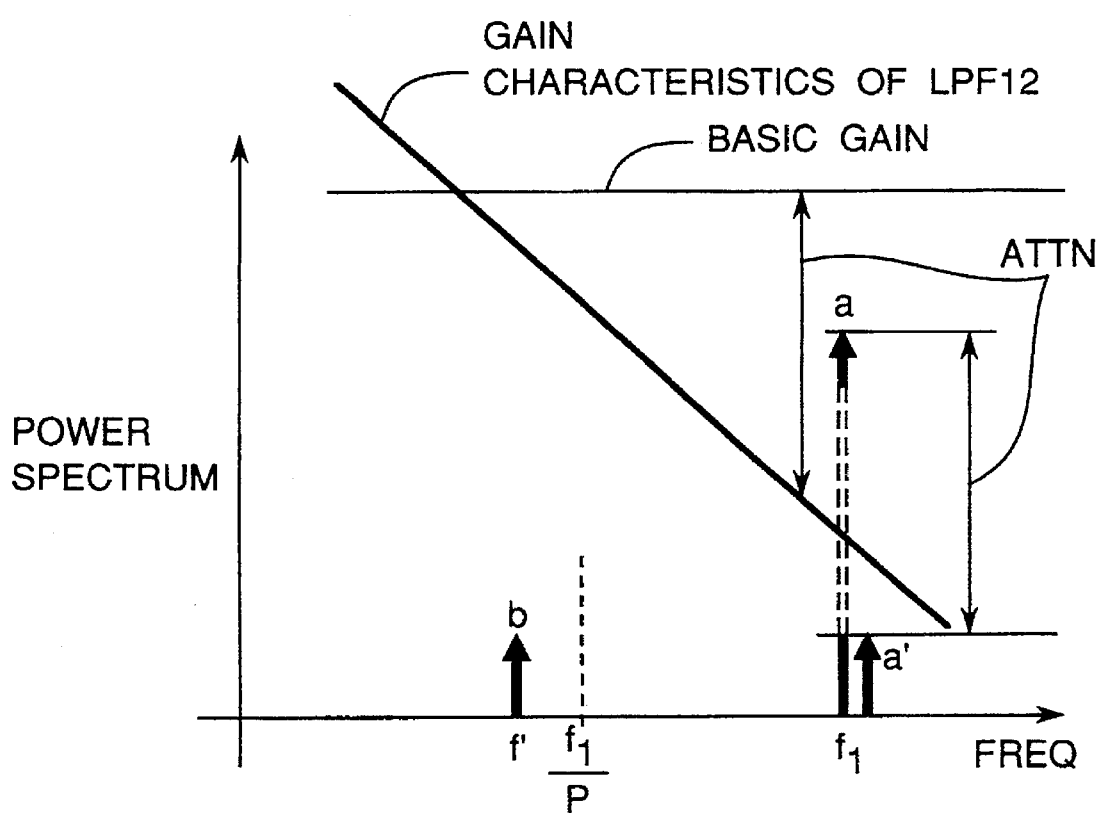
FIG. 8 is a graph showing operation characteristics of the apparatus shown in FIG. 7.

FIG. 8 is a graph showing the relationship between the frequency of the detected current and the low pass filter in FIG. 7. The drive frequency component f1 and the frequency component f' obtained from actual motor operation are obtained as frequency components of size a and b, respectively, at the output from the current sensor 3. The size of component b is smaller than a. By passing the signal through the low pass filter 12, however, the size of the drive frequency component f1 is reduced from a to a', and the attenuation of f' is less than that of f1. Therefore, the size difference between these two signal components disappears, and by adjusting the size of the signal containing both signal components, detection by means of a simple frequency discriminator is enabled.

Embodiment 3

Figure 9:
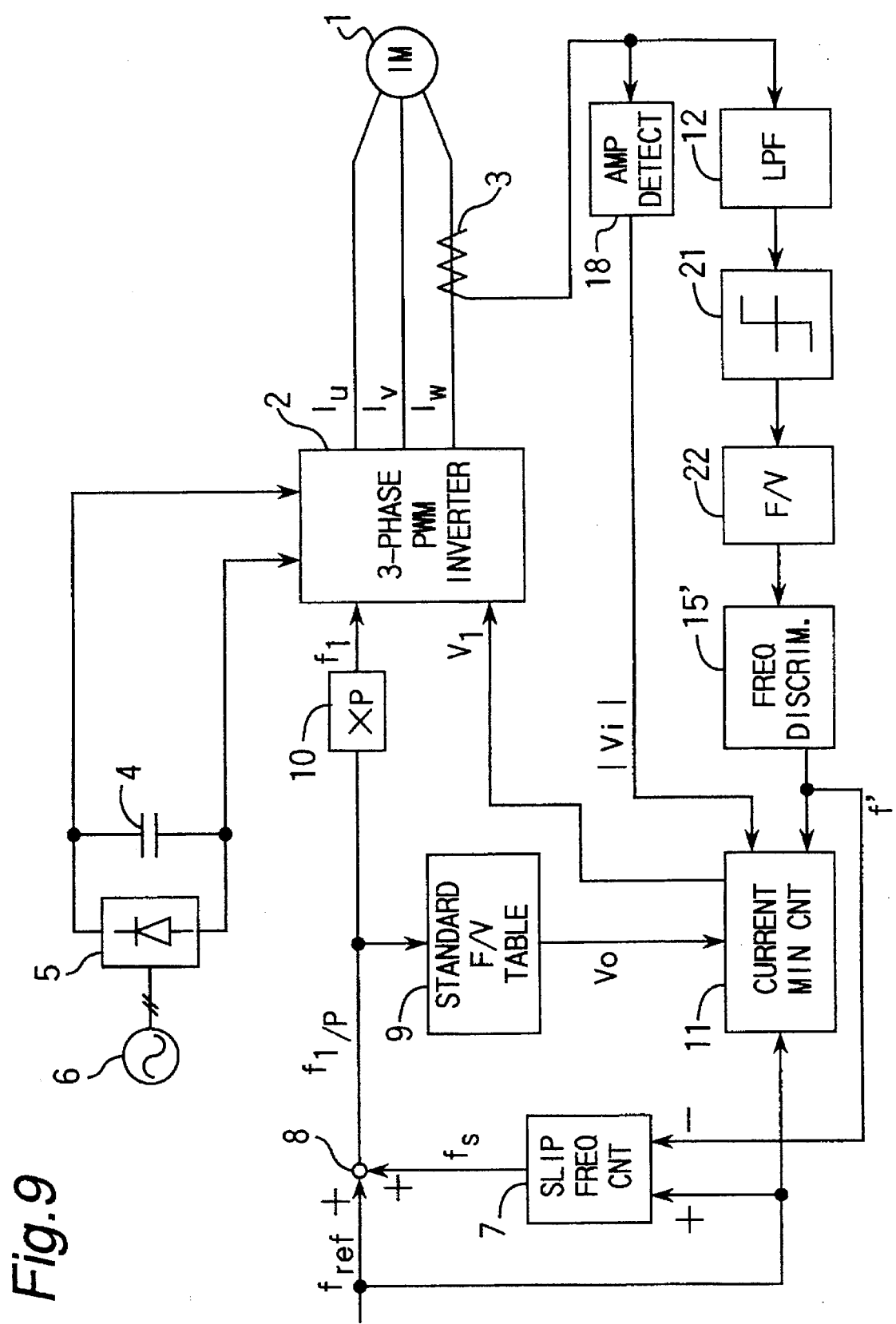
FIG. 9 is a block diagram showing an inverter control apparatus according to a third embodiment of the present invention.

FIG. 9 is a block diagram showing an inverter control apparatus according to the third embodiment of the present invention. This embodiment differs from that shown in FIG. 4 in that a low pass filter 12, a digitization means 21, and an inverse cycle counter 22 are placed between the current sensor 3 and the frequency discriminator 15'.

Figure 21A:
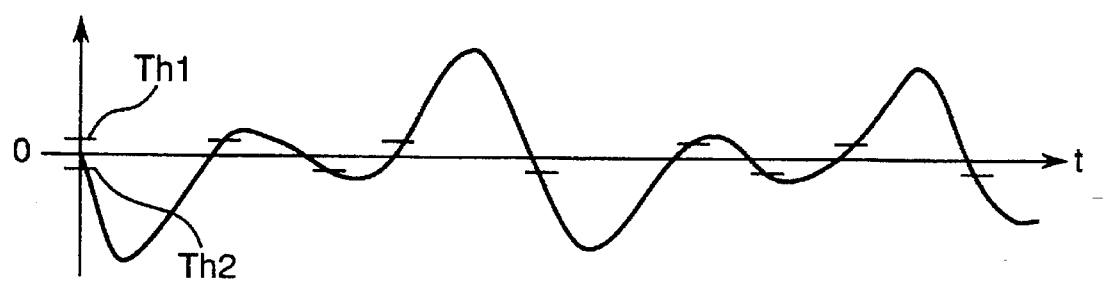
FIGS. 21A and 21B are wave forms used to describe the operation of the third embodiment of the present invention.
Figure 21B:
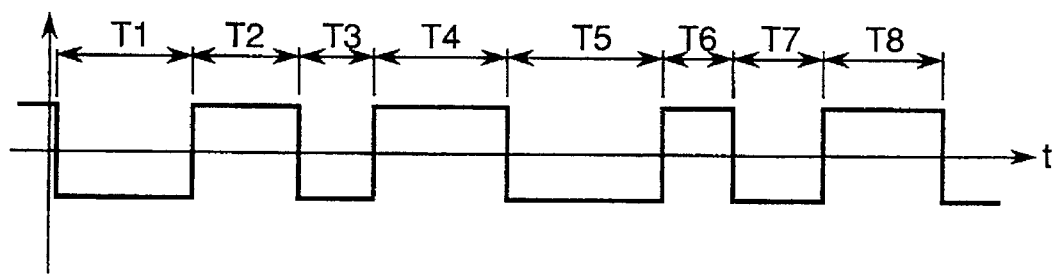

The current wave form of the induction motor 1 detected by the current sensor 3 is inputted to the low pass filter 12 whereby the motor drive frequency component is attenuated, and a signal as shown in FIG. 21A is produced. The current information from the low pass filter 12 is then inputted to the digitization means 21, which is achieved, for example, by means of an amplifier with an extremely high amplification rate with thresholds Th1 and Th2. Next, the digitization means 21 produces a digitized signal as shown in FIG. 21B, and the digitized signal is then inputted to the inverse cycle counter 22.

The inverse cycle counter 22 measures the inversion cycle periods of the digitized data. If the inversion cycle is constant, the result is also constant, and if the inversion cycle is variable, the variance also appears in the measured result.

FIG. 21A is a graph used to illustrate this principle. If the digitization threshold value supplies a constant hysteresis width at the rise and fall, there is little delay until a change occurs when the amplitude is high, but when the amplitude is low, there is a great delay before a change occurs. This is shown in FIG. 21B. If inversion cycles T1, T2, T3, . . . in FIG. 21B are counted, the change in the inversion cycle is the actual rotational frequency f'. In other words, at the end of period T1, a signal proportional to period T1 is produced, at the end of period T2, a signal proportional to period T2 is produced, and so on. The output of the inversion cycle counter 22 is inputted to the frequency discriminator 15' for discrimination of the fluctuation frequency. The discriminated frequency information reflects the actual motor speed.

Embodiment 4

Figure 10:
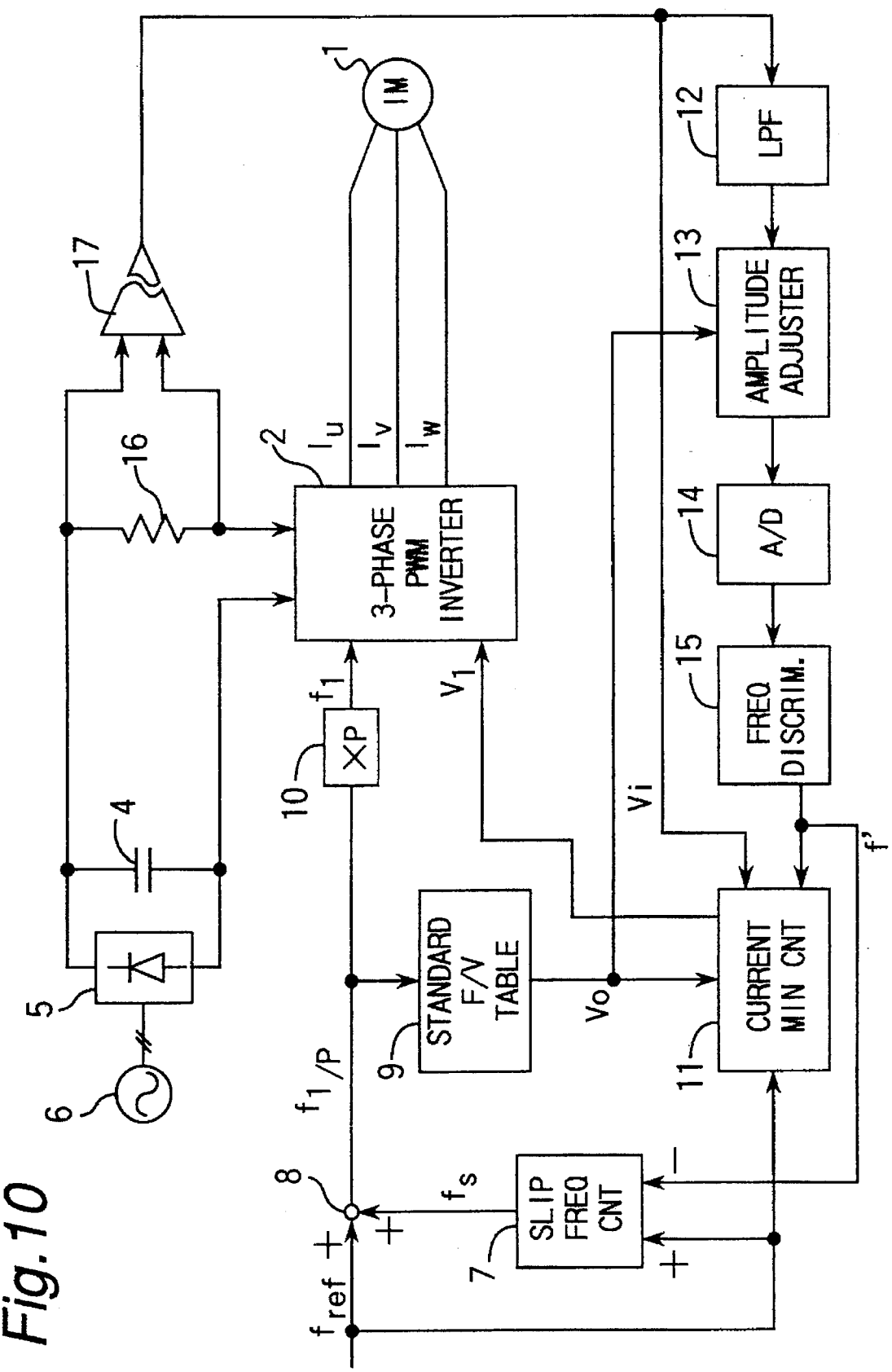
FIG. 10 is a block diagram showing an inverter control apparatus according to a fourth embodiment of the present invention.

FIG. 10 is a block diagram showing an inverter control apparatus according to the fourth embodiment of the present invention. This embodiment differs from that shown in FIG. 7 in that the current detector is placed at the input side of the inverter circuit rather than at the output side. More specifically, a low current detection resistor 16 is inserted at the input circuit of the three-phase PWM inverter 2, and the voltage across the resistor 16 is inputted to an insulated amplifier 17. The output of the amplifier 17 is applied to the low pass filter 12 and also to the current minimization controller 11.

The characteristic operation of this embodiment is described below.

Figure 11:
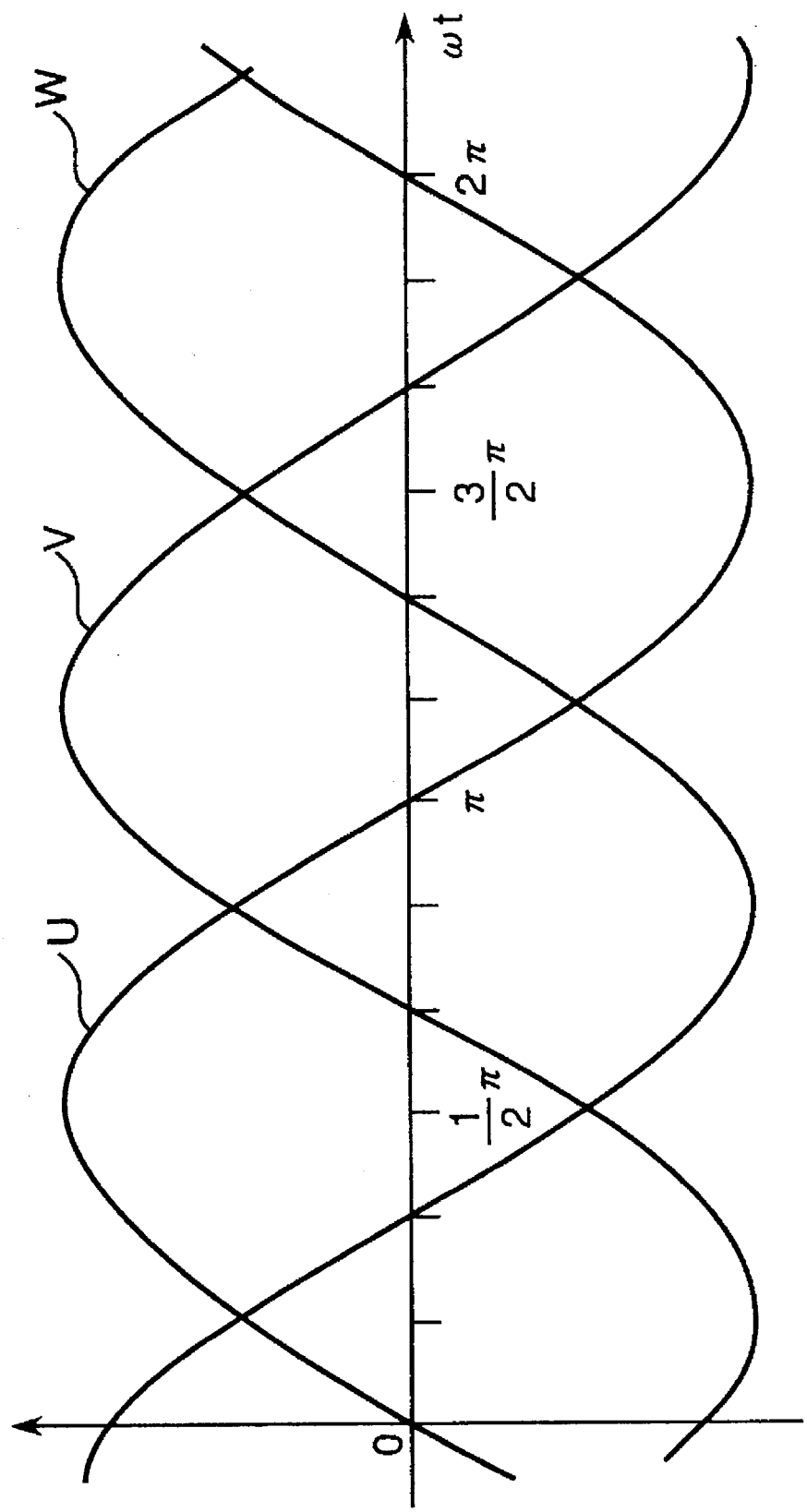
FIGS. 11, 12, 13 and 14 are graphs showing operations of the apparatus shown in FIG. 10.

FIG. 11 is a wave form diagram of the current flowing through the induction motor 1. Each phase of this three-phase AC current U, V, W is offset ⅓π from the other phases. The current flowing into the current detection resistor 16, however, is the absolute value of the peak of the three-phase current flowing through the induction motor 1 after conversion to AC current by the three-phase PWM inverter 2. This is shown in FIG. 12.

Figure 12:
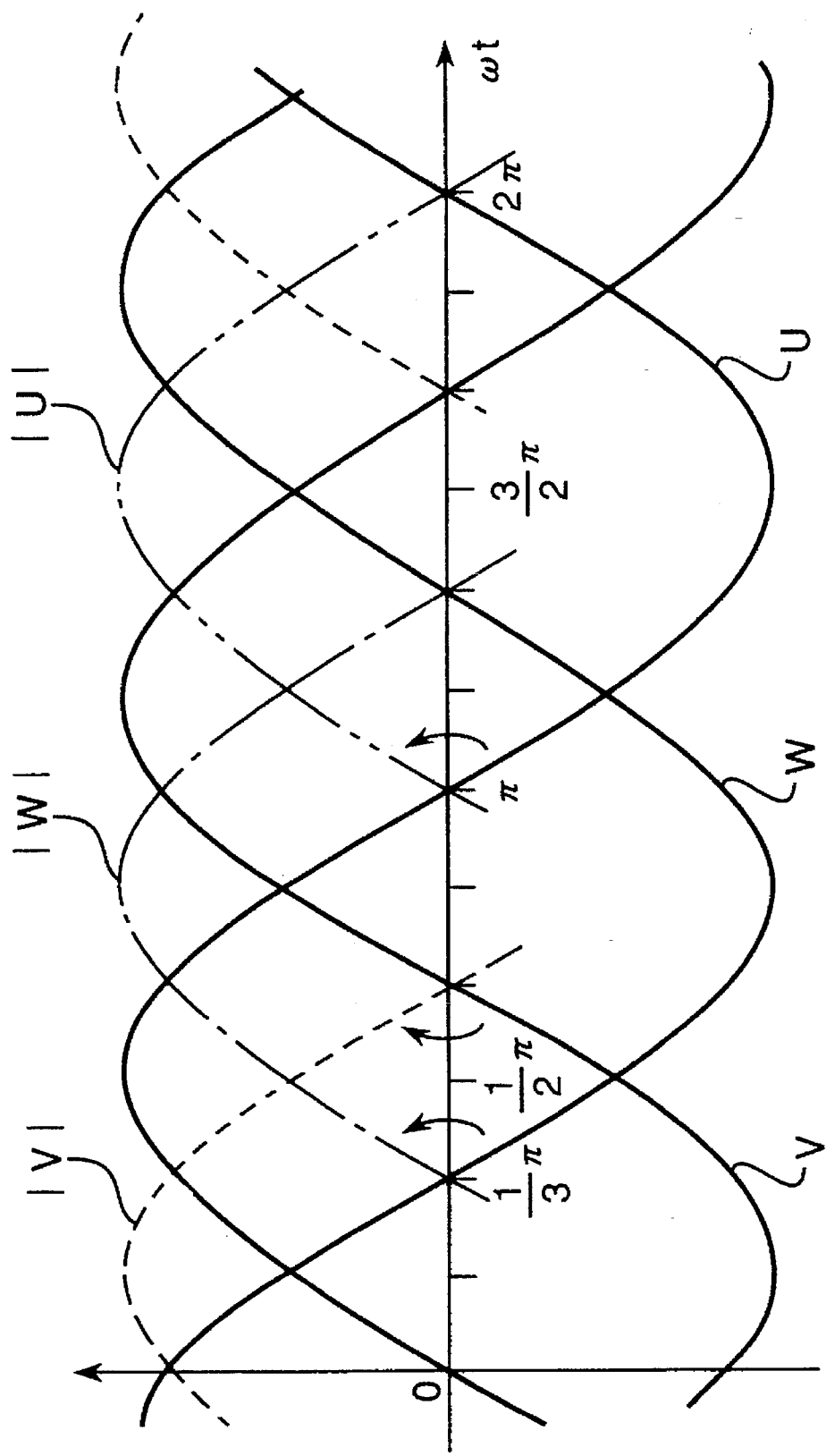
Figure 13:
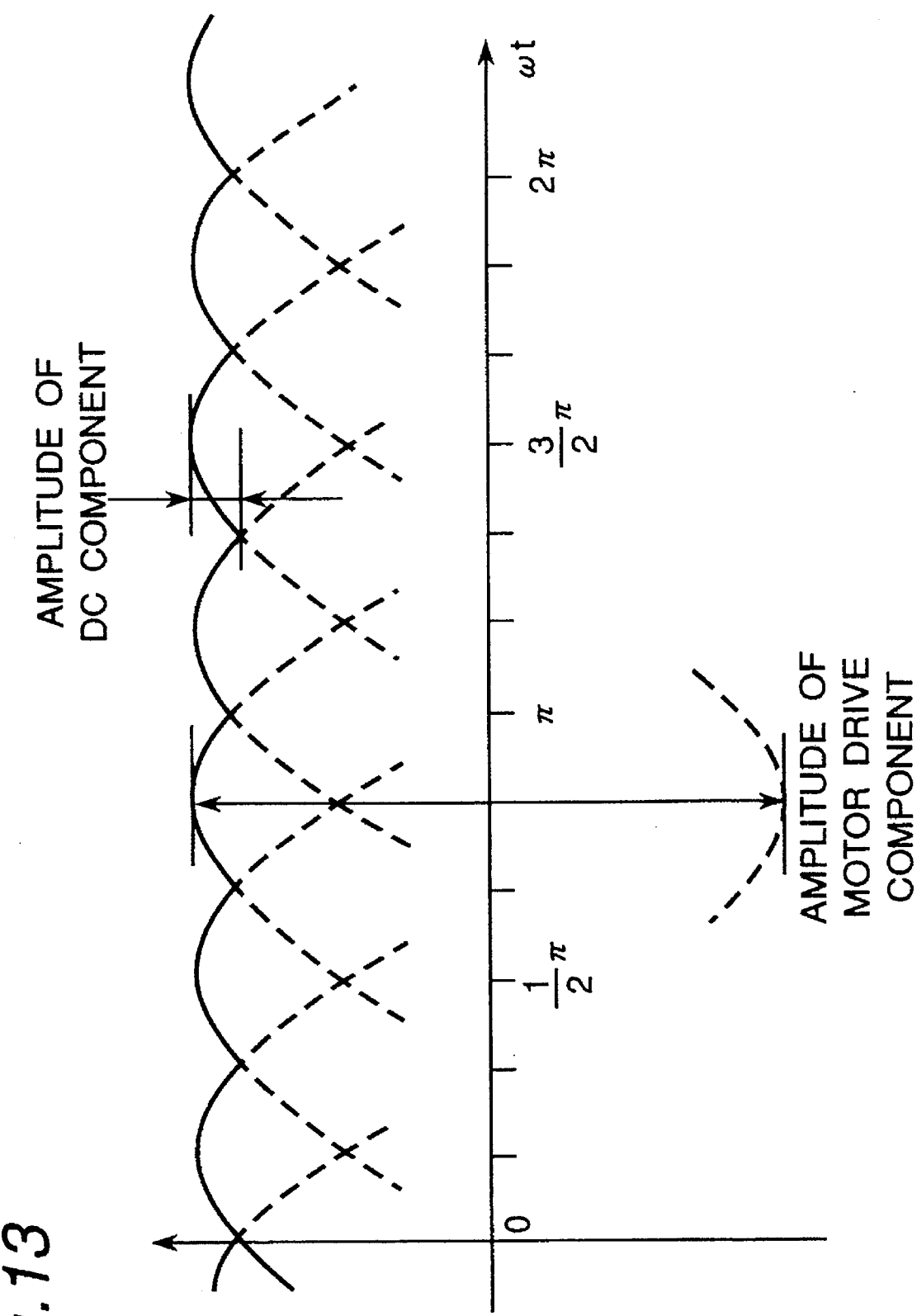

In FIG. 12, the absolute value of the phase V current is greatest in the ⅓π period to 0 where time is the phase angle, and phases U and W are opposite signs, thus consuming more current than the V phase. Because the V phase current is flowing from the DC component, the current of the DC component in FIG. 12 is −V during the period from 0 to ⅓π. Similarly, the current is phase U from ⅓π to ⅔π, −W from ⅔π to π, V from π to ¾π, −U from ⅘π to ⅝π, and W from ⅝π to 2π, thus yielding a wave as shown in FIG. 13.

The current flowing through the induction motor 1 is thus a pulse wave with a cycle six times that of the drive frequency. The amplitude is thus attenuated to 0.066987 (=0.5−sqrt (3)/4) times the amplitude of the drive frequency. The amplitude of the fundamental frequency of this pulse wave is even lower, and is 0.05456 (=⁶⁄₃₅π) times the amplitude of the drive frequency. Current movement due to compressor torque variation gives influence to the DC component, and thus the frequency and magnitude of the current movement still exists in the DC component.

Figure 22:
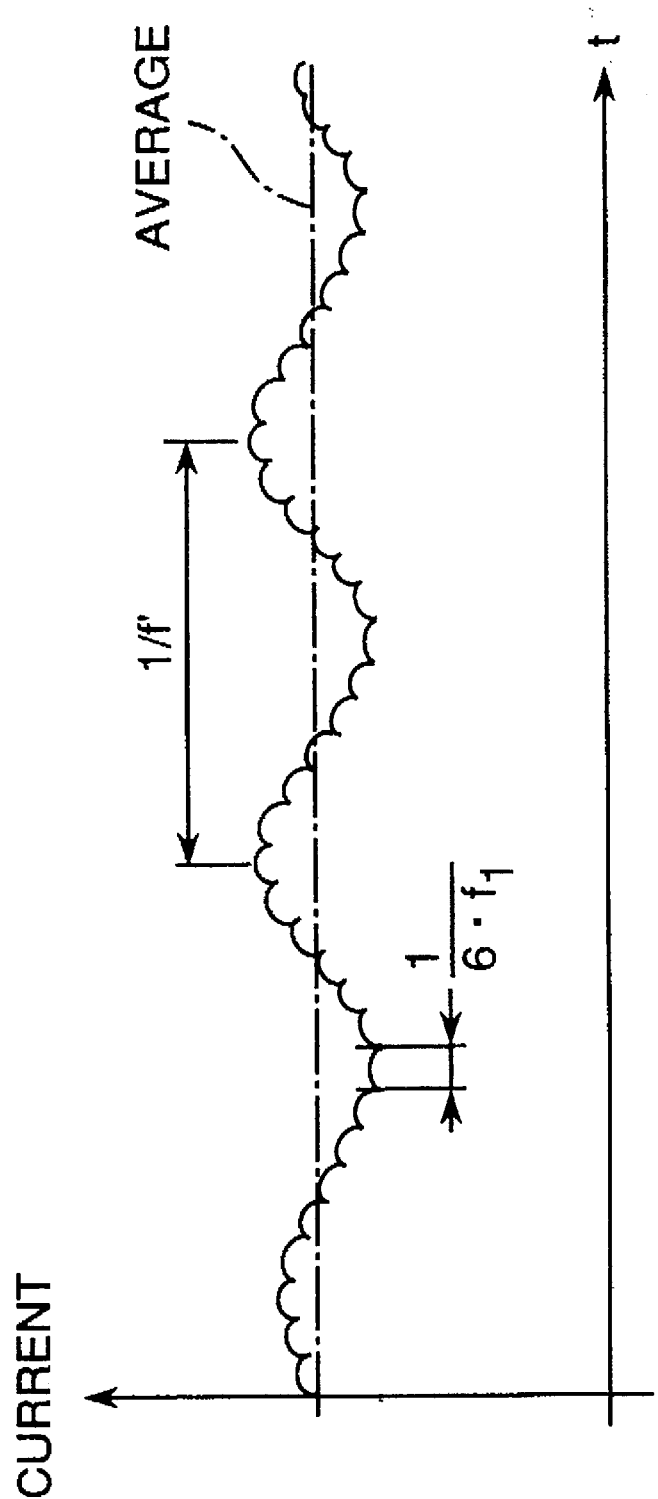
FIG. 22 is a wave form used to describe the operation of the fourth embodiment of the present invention.

FIG. 22 is the current wave of the DC component. A small pulsating signal with a cycle ⅙ that of the drive frequency f1 fluctuates at the period of the rotational frequency 1/f.

If the compressor is a rolling piston type, these pulsations are large, but the pulsations are relatively small with scroll type compressors. This relationship is shown on the frequency axis of the power spectrum shown in FIG. 14.

Figure 14:
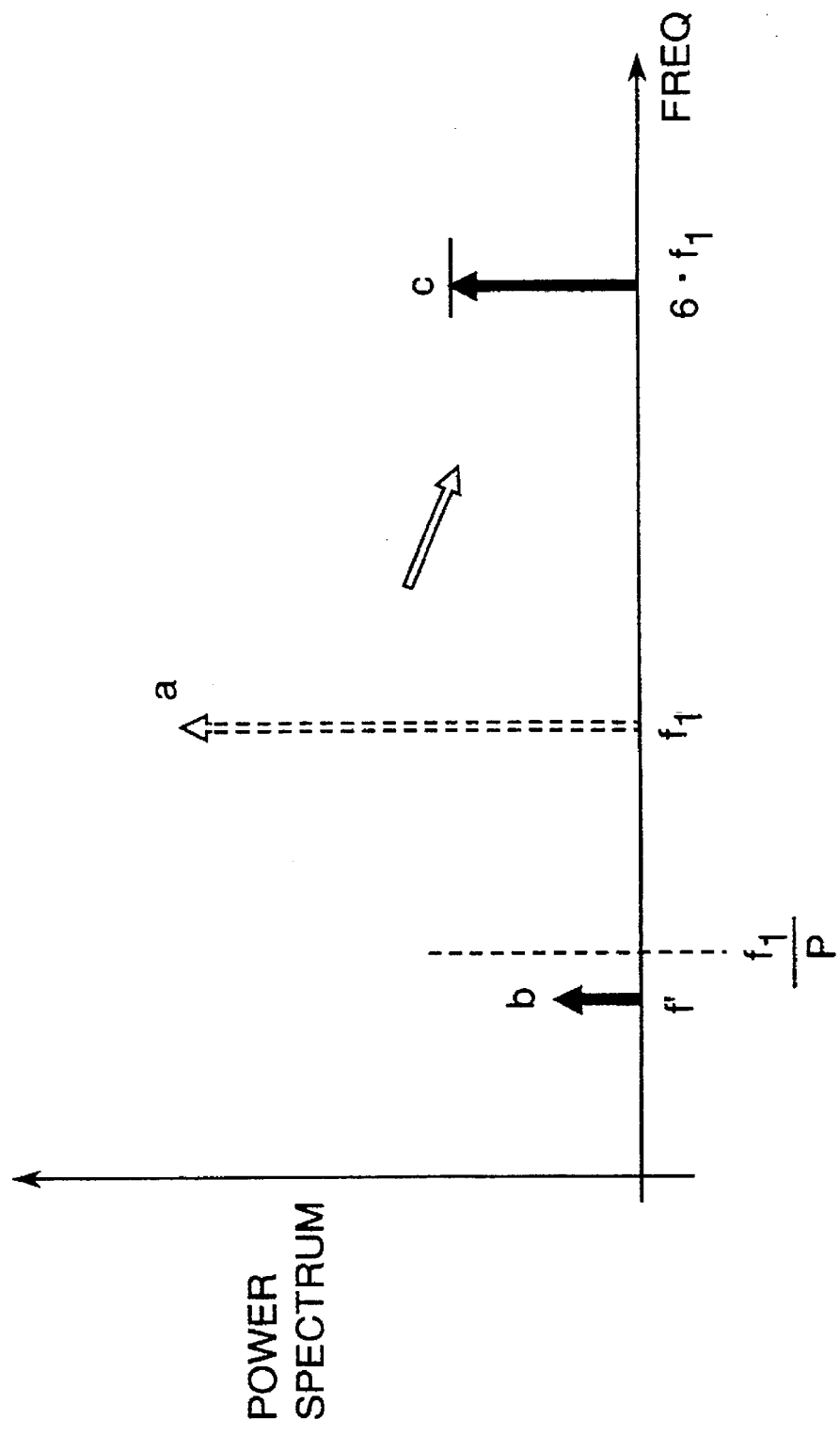

In FIG. 14, the frequency of drive frequency f1 detected by the DC component is 6* f1, and the amplitude c is attenuated to approximately ⅟₁₈ the amplitude a of the AC component. The component f' of current fluctuation due to a pulsating torque has the same frequency and amplitude b, the two signal frequencies are separated, and the current fluctuation component due to a pulsating torque is relatively large.

Therefore, the attenuation of the drive frequency component obtained by the low pass filter 12 is 36 times using a secondary filter, and six times using the simplest primary filter, and thus a relatively low precision A/C converter 14 can be used downstream. In addition, protective resistors are often used with common inverter circuits to protect the transistors and other elements used to directly control the electronic circuitry. The current detection resistor 16 of this embodiment can also be used for such protection purposes, and the present embodiment of the invention can therefore be achieved without a further increase in the number of parts.

Note that the embodiment shown in FIG. 10 has been described as measuring the current by inserting a resistor to the DC component. The invention shall not be limited to only using a resistor as the measuring means. For example, a current sensor 3 as shown in FIG. 7 can, of course, be alternatively used.

Embodiment 5

The fifth embodiment of the present invention is described below. This invention relates to the storage means 9 (RAM) for storing the standard and modified frequency-voltage conversion look-up tables for producing the command voltage V1, and can be used in any of the first through fourth embodiments of the present invention.

FIG. 17 is a graph in which the plotted points along the dotted line show data stored in the standard frequency-voltage conversion look-up table. The plotted points along the solid line show data stored in the modified frequency-voltage conversion look-up table. It is noted that both tables can be stored in the storage means (RAM) 9 in any of the embodiments disclosed herein, and in this case the command voltage V1 can be directly supplied from the storage means 9 to the three-phase PWM inverter 2.

The standard frequency-voltage conversion look-up table is previously stored in RAM 9 before the air conditioning system is supplied to the user. However, the modified frequency-voltage conversion look-up table is generated and stored after setting the air conditioning system by the operation of FIG. 16 carried out for different frequencies. This is a result of the data being different according to the setting condition.

An example of the data stored in the standard frequency-voltage conversion look-up table is shown by data points (f10, V10), (f20, V20), (f30, V30), and (f40, V40) along dotted line V0 in FIG. 17.

Next, for obtaining data for the modified frequency-voltage conversion look-up table, first the operation frequency fref is selected. Then, the operation, for example the flow chart shown in FIG. 16, starts under particular environmental conditions as set to determine the command voltage corresponding to the selected operation frequency.

For example, in FIG. 17, if the operating frequency f10 is selected, the corresponding command voltage, resulting in minimization of the current or voltage, becomes V11, thus obtaining the first data (f10, V11) for the modified frequency-voltage conversion look-up table. As the number of operating frequencies increases, the system moves closer to the optimum frequency-voltage conversion data. Furthermore, because the frequency and voltage are generally simply related, obtaining several ideal points which yield the ideal frequency-voltage characteristic will also mean that all points between those ideal points will also yield a nearly ideal characteristic. In addition, there will be only a slight drop in efficiency even at the start of operation if the initial operating values are set to obtain the frequency-voltage characteristic under standard load conditions. Thus, if operating time is also considered, no inconvenience will occur.

Figure 18:
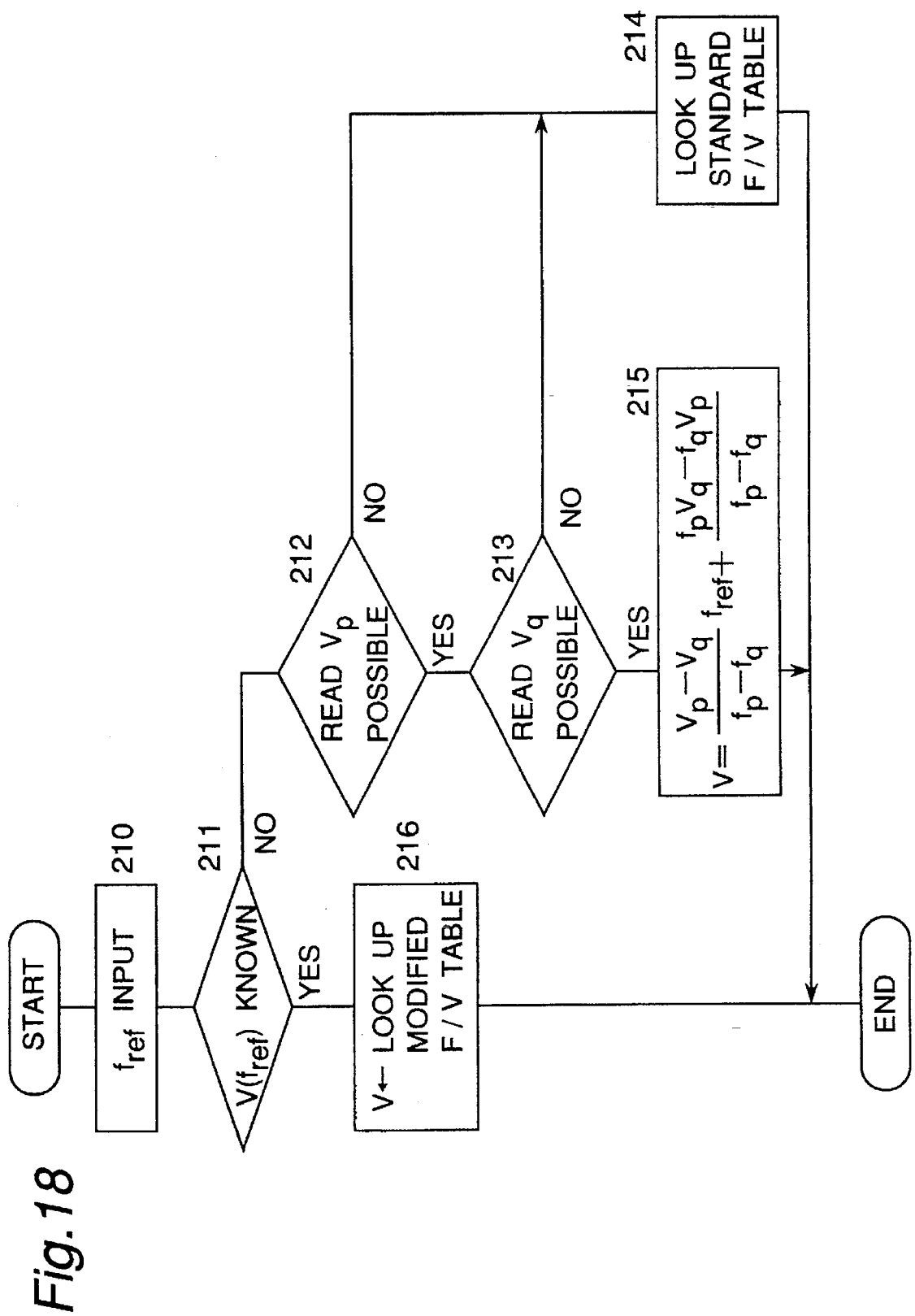
FIG. 18 is a flow chart used to describe the operation of a computer according to the fifth embodiment of the present invention.

FIG. 18 is a flow chart of the control program carried out in the current minimization controller 11 to obtain the modified frequency-voltage conversion data which is not in the look-up table, but falls between the sampled points. This program is achieved by the microprocessor shown in FIG. 15. When the rotational command frequency fref changes, the sampled value for the voltage V1 at that time is obtained. This process starts by inputting the rotational command frequency fref at step 210.

At step 211 it is determined whether the sampled value of voltage V1 for this rotational command frequency fref is in the modified frequency-voltage conversion look-up table 9.

If it is in the modified frequency-voltage conversion look-up table, control passes to step 216. If it is not in the table, control passes to step 212.

At step 212, a sampled frequency fp, which is greater than and closest to the input frequency fref, is searched for, and the voltage Vp corresponding to that sampled frequency fp is looked-up in the modified frequency-voltage conversion look-up table. If there is no such voltage Vp corresponding to the sampled frequency fp in the modified frequency-voltage conversion look-up table, control passes to step 214 where the voltage Vp corresponding to the sampled frequency fp is looked-up in the standard frequency-voltage conversion look-up table, or a simple calculation is carried out to find a corresponding voltage Vp along the doted line V0 in FIG. 17. In step 212, if there is a corresponding voltage Vp in the modified frequency-voltage conversion look-up table, the voltage Vp is read and the control passes to step 213.

At step 213, a sampled frequency fq, which is smaller than and closest to the input frequency fref, is searched for, and the voltage Vq corresponding to that sampled frequency fq is looked-up in the modified frequency-voltage conversion look-up table. If there is no such voltage Vq corresponding to the sampled frequency fq in the modified frequency-voltage conversion look-up table, control passes to step 214 where the voltage Vq corresponding to the sampled frequency fq is obtained in the same manner as described above. In step 213, if there is a corresponding voltage Vq in the modified frequency-voltage conversion look-up table, the voltage Vq is read and the control passes to step 215.

At step 215, the voltage V corresponding to the command frequency fref is calculated from the current command frequency fref and the two data sets (fp, Vp) and (fq, Vq) according to equation (2) below based on an internal relationship.

$$V = \frac{V_p - V_q}{f_p - f_q} \cdot f_{ref} + \frac{f_p V_q - f_q V_p}{f_p - f_q} \quad (2)$$

FIG. 19A shows an example of the modified frequency-voltage conversion look-up table in which a voltage corresponding to the frequency f40 is not given. When the input frequency fref is f40, the operation in FIG. 18 is carried out such that $V_p$ is V51 and $V_q$ is V31. Since f40 is at the center between f30 and f40, V=0.5(V31+V51) is obtained and stored in the table as shown in FIG. 19B.

Embodiment 6

Figure 23:
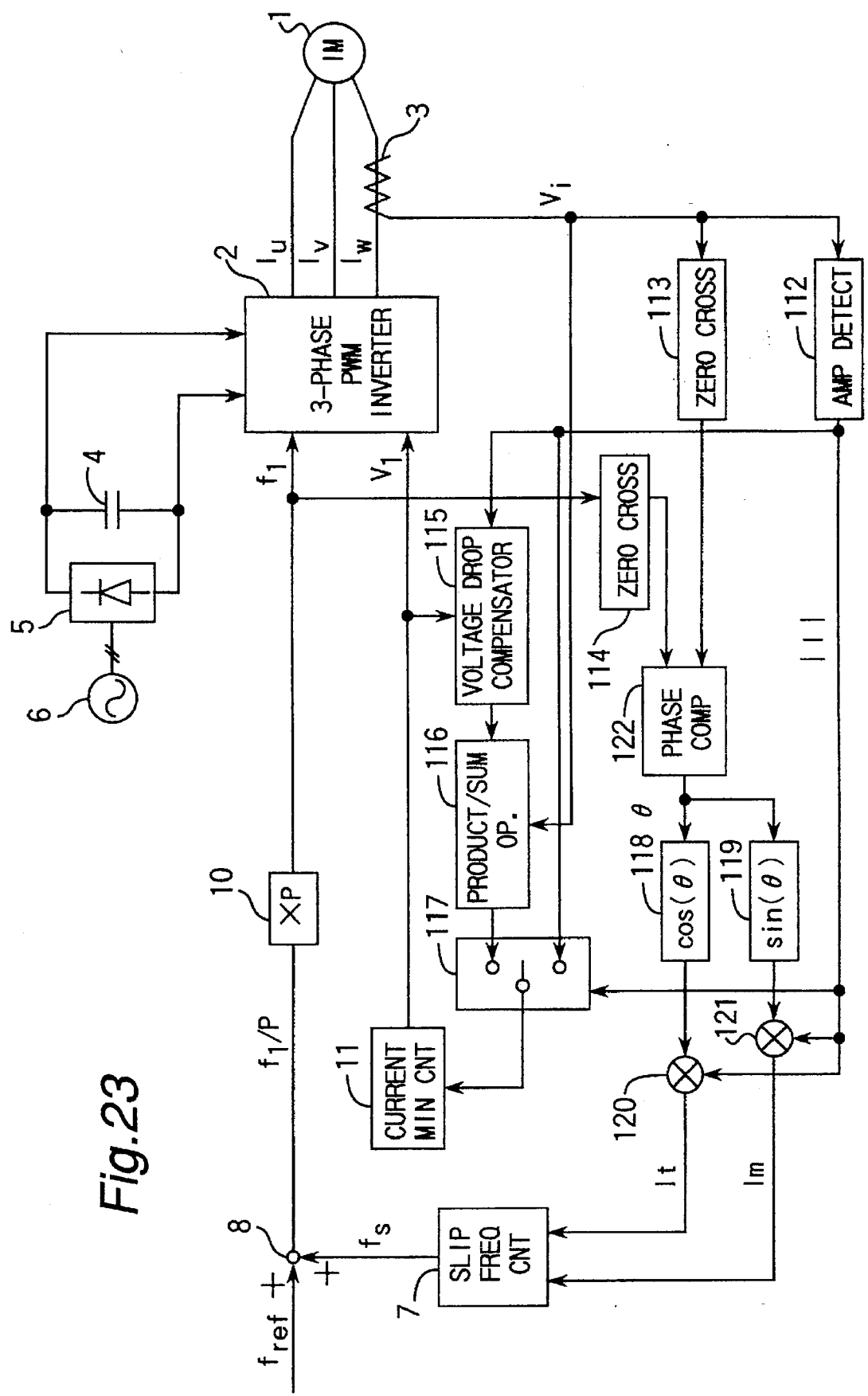
FIG. 23 is a block diagram of a sixth embodiment of the present invention.
Figure 24:
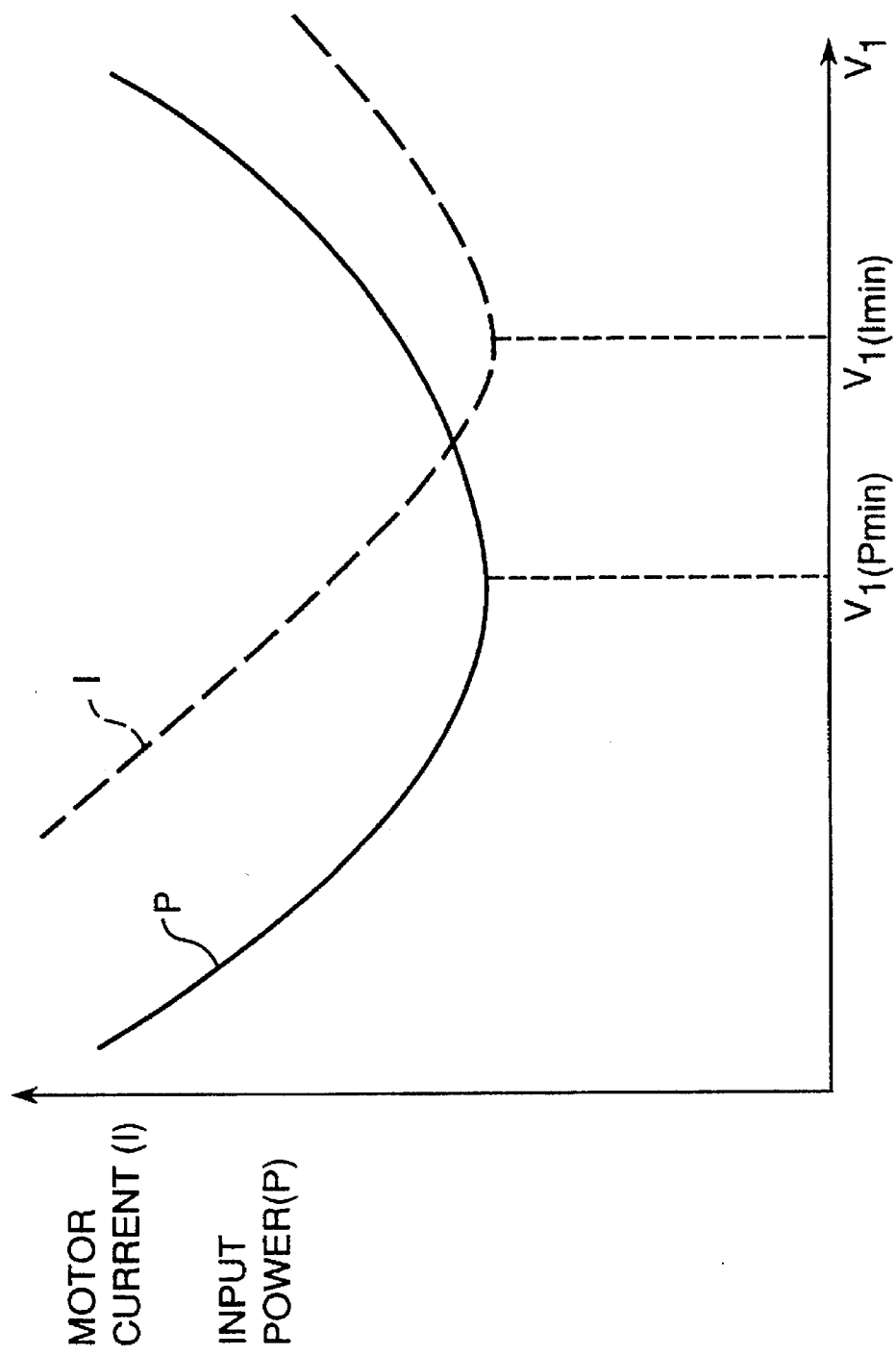
FIG. 24 is a graph showing the relationship between the voltage applied to the motor, power consumption, and motor current.

FIG. 23 is a block diagram showing an inverter control apparatus according to the sixth embodiment of the present invention.

According to this embodiment, the signal Vi obtained from the current sensor 3 is input to a product/sum operator 116, a zero cross timing detector 113, and the amplitude detector 112. The amplitude detector 112 detects the amplitude of the inputted sine wave signal Vi.

The zero cross timing detector 113 detects the timing at which the sine wave signal Vi crosses the zero level. Zero cross timing detection can be achieved in a hardware system inputting the output of a comparator or other detection circuit to the clock circuit, and can also be achieved through software by determining whether the read input signal is the same or opposite sign as the previous value. The output of the zero cross timing detector 113 is input to the phase comparator 122.

The phase information of the primary frequency information f1 is also inputted from a zero cross timing detector 114 to a phase comparator 122 as the zero cross timing for phase comparison. The phase difference is detected based on the time difference between the two timing parameters. The phase comparison result θ is inputted to function generators 118 and 119. Function generators 118 and 119 execute sin(θ) and cos(θ) operations, and output the results to multipliers 120 and 121, respectively. Multipliers 120 and 121 multiply the supplied sine and cosine values by the output supplied from the amplitude detector 112. The resulting products It and Im are transmitted to the slip frequency controller 7.

The slip frequency controller 7 calculates the frequency fs, whereby the slip frequency will become equal to the target command frequency fref, and outputs the calculated frequency f1/P to the multiplier 10 from which the frequency command f1 is produced and applied to the three-phase PWM inverter 2.

The output from the amplitude detector 112 is also input to the voltage drop compensator 115, which calculates the voltage drop component of the IGBT from the applied voltage V1, and calculates the estimated actual applied voltage. In other words, based on the voltage-current characteristics of the power control device, the voltage drop compensator 115 compensates the voltage drop component of the power control device obtained from the motor current to determine the amplitude of the voltage wave form. The compensated applied voltage is inputted to the product/sum operator 116, which calculates the sum of products with the output from the current sensor 3, i.e., to calculate the power.

The power calculated by the product/sum operator 116 and the current calculated by the amplitude detector 112 are input to the selector 117, which selects one of the inputs for output to the minimization controller 11. The switching control of the selector 117 uses the amplitude of the motor current signal Vi. Thus, when the amplitude of signal Vi is lower than a predetermined level, the power information is selected from the product/sum operator 116. Alternatively, when the amplitude of signal Vi is higher than the predetermined level, the current amplitude is selected from the sensor 3.

The minimization controller 11 adjusts the applied voltage V1 to the induction motor 1 so that the power obtained, as the sum of products of the voltage and the amplitude or current of the current quantity obtained by the current sensor 3, is the lowest. The operation of the minimization controller 11 is described below.

Therefore, the actual speed of the induction motor 1 is maintained at the target command frequency fref, and the motor current or power can be controlled to the lowest possible levels while retaining the same output.

The operation of the inverter control apparatus thus described is described in detail below. The method of detecting the slip frequency based on the phase difference between the motor current and the applied voltage is also described below.

According to Japanese Patent Publication S63-34718 (1988-34718), the torque current component It and excitation current component Im are calculated from the currents Iu, Iv, and Iw of the three wires driving a three-phase motor as shown in equations (3) below:

$Im = -b \cdot Ia + a \cdot Ib$ $It = a \cdot Ia + b \cdot Ib$ wherein $$Ia = k\left(Iu - \frac{1}{2}Iv - \frac{1}{2}Iw\right) \quad (3)$$

$$Ib = k\left(-\frac{3}{2}Iv + \frac{\sqrt{3}}{2}Iw\right)$$

in which a and b are the voltages of the two phase voltage converted from the three-phase voltage, and k is a constant.

Therefore, if the frequency is constant, Iu, Iv, and Iw are the same signal with the phase shifted $\frac{2}{3}\pi$. It is possible to calculate the other current values using the information for any one known current. The torque current component It and excitation current component Im are therefore related to the primary current amplitude I as shown in equation (4):

$$Im = I * \sin(\pi))$$

$$It = I * \cos(\pi) \quad (4)$$

where θ is the phase difference of the two-phase converted voltage and current. This phase difference is the same as the phase difference of the three-phase voltage and current. Therefore, the torque current component It and excitation current component Im can be calculated by obtaining the current-voltage phase difference. The slip frequency fs can also be obtained using the following equation (5) according to Japanese Patent Publication S63-34718 (1988-34718):

$$fs = \frac{It}{2\Pi \cdot T2\{Im/(1+PT2)\}} \quad (5)$$

where P is a differential operator, and T2 is a secondary time constant of the motor. However, because the effect of the differential operator can be ignored when there is no frequency change, the slip frequency fs can be calculated by dividing the torque current components It by the product of the excitation current component Im, secondary time constant T2, and $2\pi$.

Figure 26:
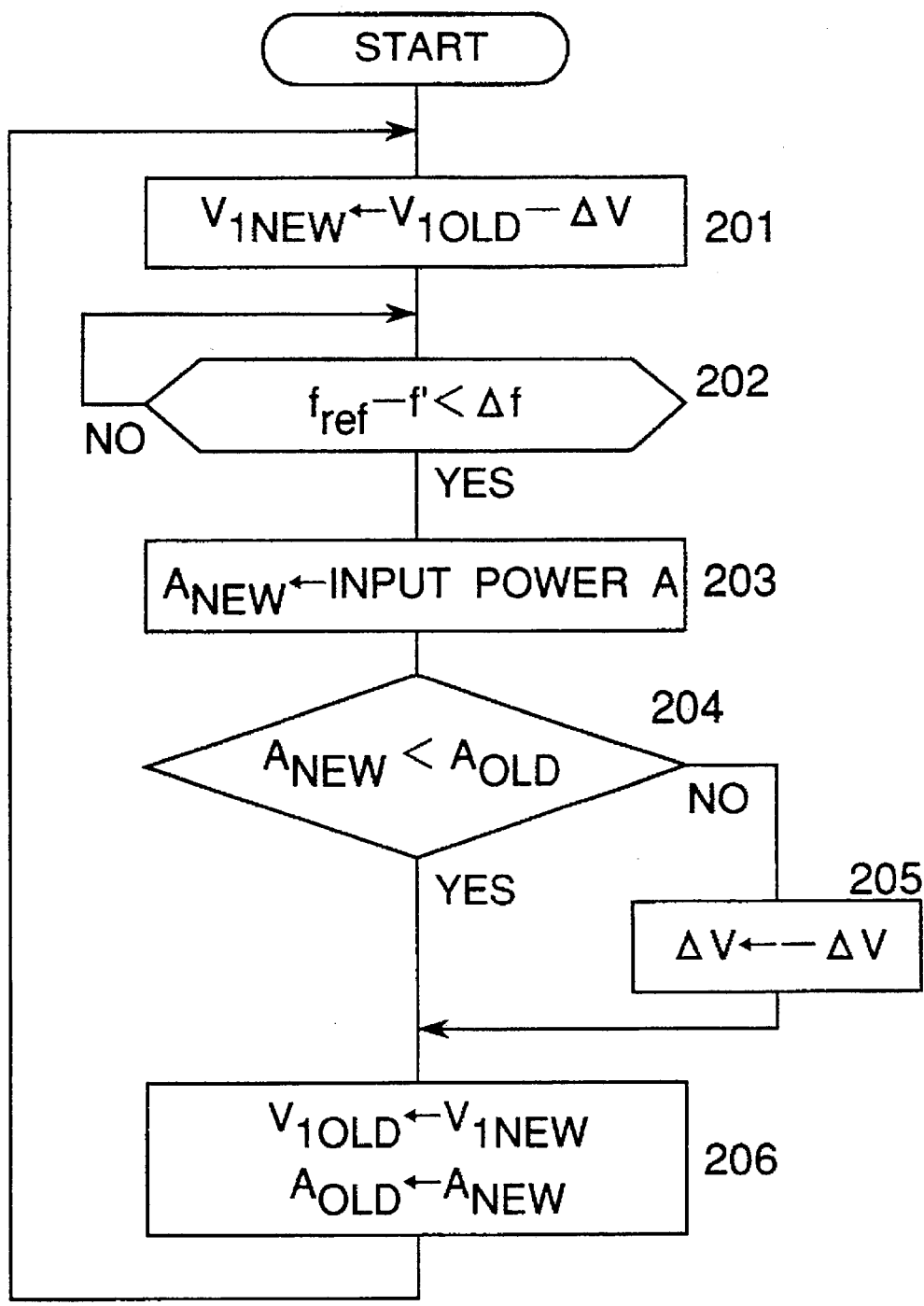
FIG. 26 is a flow chart used to describe the operation of the sixth embodiment.

The operation of the minimization controller 11 is described next. FIG. 26 is a control flow chart showing the operating principle of the minimization controller 11.

Referring to FIG. 26, the minimization control starts after selecting the command frequency fref. This minimization control starts by outputting the difference of a small voltage ΔV subtracted from the previous output voltage $V_{OLD}$ as the inverter output voltage (step 201). The procedure then pauses until slip frequency compensation control stabilizes at this output voltage (step 202). The determination as to whether the slip frequency compensation control has stabilized is performed by comparing the command frequency fref with the actual rotational frequency f' or slip frequency, calculated from the torque current It, or other parameters. The slip frequency compensation control has stabilized when these two frequencies match.

It is also possible to experimentally determine the time required for the slip frequency compensation control to stabilize, and use a constant wait time which is slightly longer than this experimentally determined time.

Once the slip frequency compensation control has stabilized, a signal A representing the power being supplied to the induction motor 1 is determined and stored as variable $A_{NEW}$ (step 203). The signal Vi representing the current i can be used instead of the signal A.

The values of the present variable $A_{NEW}$ and the variable $A_{OLD}$ supplied in the previous control cycle are then compared (step 204). If the new value is smaller than the old value, control proceeds to step 206. If the new value is greater than the old value, the polarity of the low voltage ΔV is reversed (step 205), and control then proceeds to step 206.

The current voltage $V1_{NEW}$ and variable $A_{NEW}$ are then stored as the old voltage $V_{OLD}$ and old variable $A_{OLD}$ (step 206), respectfully, in preparation for the next cycle, and the control loops back to step 201.

It is thereby possible to drive the induction motor 1 at the lowest possible current or power level while leaving the current or power fluctuation as being equivalent to the small voltage ΔV value. Furthermore, by storing the voltage corresponding to the minimum current or minimum power level obtained by this method as the optimum voltage at a particular frequency, it is possible to quickly restore the optimum voltage at the particular frequency even after the command frequency fref varies temporarily to a different frequency. The current information used by the minimization controller 11 is for alternating current in this embodiment, and the effective value or maximum value is used. The amplitude detector 112 shown in FIG. 23 corresponds to the means for using these values.

Figure 25:
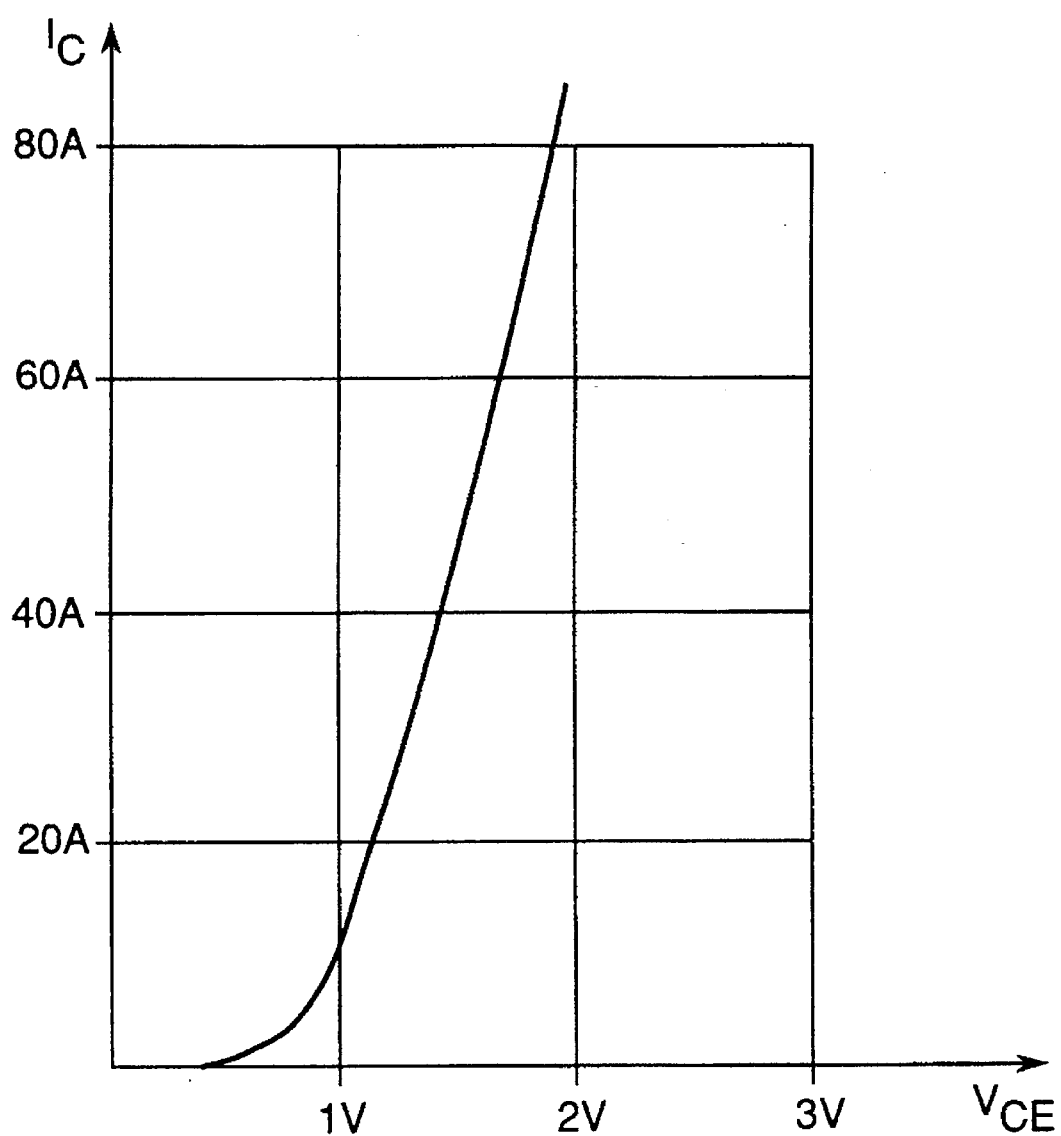
FIG. 25 is a graph showing a current-voltage characteristics when the power control device is ON in the sixth embodiment.

The operation of the voltage drop compensator 115 is described next. FIG. 25 is a graph showing the current-voltage characteristics when the power control device IGBT is ON (this device is described by Takanashi et al., in a Japanese language document "Third generation intelligent power modules," Mitsubishi Electric Technical Review, Vol. 67, No. 9, 1993, pp. 71, FIG. 11). Specifically, when the collector current Ic reaches 10 A or greater, the ON voltage Vce(sat) is increasing in a substantially linear manner. Therefore, Vce(sat) is determined by determining the collector current Ic. Because the collector current Ic corresponds to the motor current I1, if the motor current I1 is known, then Vce(sat) is known. This relationship is environmentally independent, but is fixed once the IGBT and PWM modulation frequencies are known. These values can therefore be easily obtained by predetermining and storing the values in a microprocessor or other means for quick retrieval.

It will become obvious that the present invention is not limited to applications with air conditioning systems, but can be applied to a wide range of apparatuses, including other air compressors producing compressed air, power machinery and tools, and any other device comprising an inverter to which the command frequency f1 and command voltage V1 are inputted.

By means of the invention thus described, it is possible to achieve high precision, high efficiency inverter control whereby power consumption can be constantly maintained at the lowest required level relative to the operating environment even with a three-phase motor by providing only one current detector and without requiring input of a motor constant. The second through fourth embodiments of the present invention described above are particularly effective with low pulsating torque loads, as are encountered with scroll compressors. It is therefore possible to achieve a high efficiency air conditioning system characterized by smooth, quiet, low vibration, low noise operation.

By accumulating and obtaining the most efficient frequency-voltage characteristics by searching in the modified frequency-voltage conversion look-up table, it is possible by means of the fifth embodiment of the present invention described above to achieve a simple, high precision inverter comprising a learning function whereby the optimum frequency-voltage characteristics can be gradually accumulated across the entire operating range.

By means of the sixth embodiment of the present invention as described above, only a single current detector is required even with a three-phase motor, rather than the two current detection means required by the prior art. It is therefore possible to achieve high precision, high efficiency inverter control whereby power consumption can be constantly maintained at the lowest required level relative to the operating environment.

Furthermore, by combining the current minimization control techniques, the maximum capacitance of the power control device can be reduced, and the apparatus itself therefore can be reduced in size.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An inverter control apparatus for controlling an inverter which, upon receipt of a command frequency and a command voltage, supplies AC power of a desired frequency to an induction motor, said inverter control apparatus comprising:

means for receiving a requested rotational speed of the induction motor;

current detection means for detecting a drive current supplied to the induction motor;

discrimination means for discriminating a frequency of a fluctuation component of the drive current detected by said current detection means, said fluctuation component frequency representing an actual rotational speed of the induction motor;

slip detection means for detecting a slip amount of the induction motor by taking a difference between said actual rotational speed and said requested rotational speed;

command frequency producing means for producing data commensurate with said command frequency by adding said slip amount to said requested rotational speed; and command voltage generating means for generating said command voltage by monitoring said drive current and for setting said command voltage to a voltage acquired when said drive current is at a minimum value.

2. An inverter control apparatus according to claim 1, wherein said discrimination means comprises a plurality of bandpass filters and an amplitude detection means.

3. An inverter control apparatus according to claim 1, wherein said discrimination means comprises a filter for filtering said fluctuation component.

4. An inverter control apparatus according to claim 3, wherein said discrimination means comprises an amplifier in which the degree of amplification is inversely proportional to a voltage applied thereto.

5. An inverter control apparatus according to claim 1, wherein said discrimination means comprises an analog-to-digital converter for converting said drive current.

6. An inverter control apparatus according to claim 1, wherein said discrimination means comprises:

a filter for filtering said fluctuation component;

a digitizing means for digitizing an output from said filter; and a detecting means for detecting a frequency of an output from said digitizing means.

7. An inverter control apparatus according claim 1, wherein said current detection means comprises a DC current detection means for detecting a DC current applied to said inverter, and said discrimination means is operable to discriminate a frequency of a fluctuation component of the DC current detected by said DC current detection means.

8. An inverter control apparatus according to claim 1, wherein said discrimination means, slip detection means, command frequency producing means, and command voltage generating means are formed by a digital computer.

9. An inverter control apparatus according to claim 1, wherein said command voltage generating means comprises:

memory means for storing standard frequency-voltage conversion data for converting said data commensurate with said command frequency to a voltage signal, said voltage signal being adjusted to produce said command voltage.

10. An inverter control apparatus according to claim 9, wherein said command voltage generating means is a computer based processor for adjusting said voltage signal in real time.

11. An inverter control apparatus for controlling an inverter which, upon receipt of a command frequency and a command voltage, supplies AC power of a desired frequency to an induction motor, said inverter control apparatus comprising:

current dection means for detecting a drive current supplied to the induction motor;

power calculation means for calculating a power consumption of the induction motor based on the sum of products of an integer at multiple periods of the cycle of an output voltage of the inverter and the drive current at a period greater than one cycle of the output voltage of the inverter; and command voltage generating means for generating said command voltage by monitoring said power consumption and for setting said command voltage to a voltage acquired when said power consumption is at a minimum value.

12. An inverter control apparatus according to claim 11, further comprising:

means for receiving a requested rotational speed of said motor;

current conversion means for calculating an excitation current and a torque current of the induction motor based on a phase difference between an output voltage of the inverter and the drive current;

slip amount calculation means for calculating a slip amount based on said excitation current, said torque current, and a time constant of the motor; and command frequency producing means for producing a data commensurate with said command frequency by adding said slip amount to said requested rotational speed.

13. An inverter control apparatus according to claim 12, wherein said current conversion means comprises first zero-cross detection means for detecting a zero-cross point of said drive current, and a second zero-cross detection means for detecting a zero-cross point of the output voltage of the inverter.

14. An inverter control apparatus according to claim 12, wherein said power calculation means, command voltage generating means, current conversion means, slip amount calculation means, and command frequency producing means are formed by a digital computer.

15. An inverter control apparatus according to claim 11, wherein a difference between a no-load output voltage of the inverter and a voltage proportional to said drive current is substantially equal to the output voltage of the inverter used in said power calculation means.

16. An inverter control apparatus for controlling an inverter which, upon receipt of a command frequency and a command voltage, supplies AC power of a desired frequency to an induction motor, said inverter control apparatus comprising:

current detection means for detecting a drive current applied to said motor;

power calculation means for calculating a power consumption of the induction motor based on the sum of products of an output voltage of the inverter and the drive current;

selecting means for selecting either said drive current or said power consumption, said drive current being selected when said drive current is greater than a predefined current level, and said power consumption being selected when said drive current is less than said predefined current level; and command voltage generating means for generating said command voltage by monitoring selected data provided by said selecting means and for setting said command voltage to a voltage acquired when said selected data is at a mimimum value.

17. An inverter control apparatus according claim 16, wherein a difference between a no-load output voltage of the inverter and a voltage proportional to said drive current is substantially equal to the output voltage of the inverter used in said power calculation means.

* * * * *